US007349863B1

(12) United States Patent
Peña-Mora et al.

(10) Patent No.: US 7,349,863 B1
(45) Date of Patent: Mar. 25, 2008

(54) DYNAMIC PLANNING METHOD AND SYSTEM

(75) Inventors: Feniosky Peña-Mora, Champaign, IL (US); Moonseo Park, Seoul (KR); SangHyun Lee, Somerville, MA (US); Michael Li, Palos Verdes Estates, CA (US); Margaret Fulenwider, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 978 days.

(21) Appl. No.: 10/068,119

(22) Filed: Feb. 6, 2002

Related U.S. Application Data

(60) Provisional application No. 60/298,459, filed on Jun. 14, 2001.

(51) Int. Cl.
  *G05B 19/418* (2006.01)
  *G06F 17/50* (2006.01)
  *G06F 19/00* (2006.01)
  *G06F 9/44* (2006.01)
  *G06F 9/46* (2006.01)

(52) U.S. Cl. .............................. 705/8; 700/97; 700/108; 705/7; 705/9; 703/1

(58) Field of Classification Search .................. 703/1; 700/97, 108; 705/8, 9
See application file for complete search history.

(56) References Cited

U.S. PATENT DOCUMENTS

| | | |
|---|---|---|
| 4,368,509 A | 1/1983 | Li |
| 4,472,770 A | 9/1984 | Li |
| 4,710,864 A | 12/1987 | Li |
| 4,797,839 A | 1/1989 | Powell |
| 4,852,001 A | 7/1989 | Tsushima |
| 4,910,660 A | 3/1990 | Li |
| 4,937,743 A | 6/1990 | Rassman et al. |
| 5,016,170 A * | 5/1991 | Pollalis et al. .................. 705/7 |

(Continued)

FOREIGN PATENT DOCUMENTS

WO  WO101206 A2  1/2001

OTHER PUBLICATIONS

Allweyer et al., "Model-Based Re-Engineering in the European Construction Industry" 1996, Construction Informatics Digital Library, p. 1-11.*

(Continued)

*Primary Examiner*—Anthony Knight
*Assistant Examiner*—Thomas Stevens
(74) *Attorney, Agent, or Firm*—Daly, Crowley, Mofford & Durkee, LLP

(57) ABSTRACT

A dynamic planning method (DPM) generates a DPM project planning model. The DPM project planning model provides an activity pre-structured process model for activities of a DPM project plan. The DPM project planning model also provides a relationship pre-structured model for activity time precedence relationships of the DPM project plan. The DPM project planning model is dynamically adjusted to generate a DPM project plan, whereby reliability buffers are associated with one or more activities of the plan. Time precedence relationships are associated with the reliability buffers and with the activities. A variety of DPM simulation outputs are also generated. The DPM simulation outputs provide a comparison of the DPM project plan with conventional project plans generated by conventional project planning models.

23 Claims, 15 Drawing Sheets

U.S. PATENT DOCUMENTS

| | | | |
|---|---|---|---|
| 5,021,976 A | | 6/1991 | Wexelblat et al. |
| 5,053,970 A | | 10/1991 | Kurihara et al. |
| 5,057,992 A | | 10/1991 | Traiger |
| 5,111,404 A | * | 5/1992 | Kotani ........................ 700/108 |
| 5,128,860 A | * | 7/1992 | Chapman ..................... 700/99 |
| 5,148,365 A | | 9/1992 | Dembo |
| 5,173,869 A | * | 12/1992 | Sakamoto et al. ............. 703/6 |
| 5,229,948 A | | 7/1993 | Wei et al. |
| 5,303,170 A | * | 4/1994 | Valko ............................ 703/2 |
| 5,321,620 A | * | 6/1994 | Tanaka et al. ............... 700/104 |
| 5,369,570 A | | 11/1994 | Parad |
| 5,381,332 A | | 1/1995 | Wood |
| 5,414,843 A | | 5/1995 | Nakamura et al. |
| 5,524,077 A | | 6/1996 | Faaland et al. |
| 5,537,524 A | | 7/1996 | Aprile |
| 5,623,404 A | | 4/1997 | Collins et al. |
| 5,671,360 A | | 9/1997 | Hambrick et al. |
| 5,737,728 A | | 4/1998 | Sisley et al. |
| 5,748,907 A | | 5/1998 | Crane |
| 5,761,674 A | | 6/1998 | Ito |
| 5,764,543 A | | 6/1998 | Kennedy |
| 5,765,139 A | | 6/1998 | Bondy |
| 5,767,848 A | | 6/1998 | Matsuzaki et al. |
| 5,826,252 A | | 10/1998 | Wolters et al. |
| 5,893,074 A | | 4/1999 | Hughes et al. |
| 5,907,490 A | | 5/1999 | Oliver |
| 5,918,219 A | | 6/1999 | Isherwood |
| 6,047,260 A | | 4/2000 | Levinson |
| 6,101,481 A | | 8/2000 | Miller |
| 6,122,633 A | | 9/2000 | Laymann et al. |
| 6,289,340 B1 | | 9/2001 | Puram et al. |
| 6,415,196 B1 | * | 7/2002 | Crampton et al. .......... 700/100 |
| 6,931,365 B1 | | 8/2005 | Mehta et al. |

OTHER PUBLICATIONS

Mora et al., "Dynamic Planning and Control Methodology for Design/Build Fast-Track Construction Projects" (Jan./Feb. 2001), p. 1-17.*

ReDS—a dynamic planning, scheduling, and control system for manufacturing. Hadavi, K; Shahraray, M S; Voigt, Journal of Manufacturing Systems. vol. 9, No. 4, pp. 331-344. 1990.*

Sawimey-A., "Petri Net Based Simulation of Construction Schedules" IEEE 1997. p. 1111-1118.*

Li, Michael In-Chiang, "A Robust Planning and Control Methodology for Design-Build Fast-Track Civil Engineering and Architectural Projects", Feb. 1999, pp. 1-107.

Park, Moonseo, "Robust Control of Cost Impact on Fast-Tracking Building Construction Projects," Jun. 1999, pp. 2-75.

Park, M. and Peña-Mora, F., "Dynamic Planning and Control of Large-Scale Infrastructure Projects," ASCE/ICCCBE 2000 Conference I Computing in Civil and Building Engineering, Stanford, CA, ASCE Press, Redmond, VA Aug. 2000, pp. 414-467.

Park, Moonseo et al., "Dynamic Planning and Control of Construction Projects", Aug. 15, 2000, pp. 301-347.

Peña-Mora, Feniosky and Park, Moonseo, "Dynamic Planning and Control Methodology for Large-Scale Infrastructure Projects," Mar. 2001, pp. 301-347.

Lee, SanHyun, "Research Progress Report The Dynamic Planning and Control Methodology in Global Construction Management," Research Progress Report, MIT, Mar. 23, 2001, pp. 1-37.

Fulenwider, Margaret, "Dynamic Planning and Control for Large-Scale Infrastructure Projects: Route 3N as a Case Study," Research Progress Report, MIT, Mar. 23, 2001, 38 pgs.

Park, Moonseo, "Dynamic Planning and Contol Methodology for Large-Scale Concurrent Construction Projects," Apr. 3, 2001, pp. 348-372.

Park, M. and Peña-Mora, F., Reliability Buffering for Concurrent Construction, submitted for review to the ASCE Journal of Construction Engineering and Management, Jun. 2001, pp. 284-300.

Peña-Mora, Feniosky, and Park, Moonseo, "Dynamic Planning for Fast-Tracking Building Construction Projects," ASCE Journal of Construction Engineering and Management, vol. 127, No. 6, Dec. 2001, pp. 1-12.

Peña-Mora, Feniosky and Dwivedi, G., "Multiple Device Collaborative and Real Time Analysis System for Project Management in Civil Engineering," ASCE Journal of Computing in Civil Engineering, vol. 16, No. 1, Jan. 2002, pp. 373-401.

Peña-Mora et al.; "Component-based Software Development for Integrated Construction Management Software Applications;" Aug. 2000; Artifical Intelligence for Engineering Design; pp. 173-187.

* cited by examiner

DYNAMIC PLANNING METHOD AND SYSTEM

CROSS REFERENCE TO RELATED APPLICATIONS

This application claims the benefit of U.S. Provisional Application No. 60/298,459, filed on Jun. 14, 2001 which application is hereby incorporated herein by reference in its entirety.

STATEMENT REGARDING FEDERALLY SPONSORED RESEARCH

This invention was made with government support under Contract No. 9875557 awarded by the National Science Foundation, Civil Mechanical Systems Division. The government has certain rights in the invention.

FIELD OF THE INVENTION

This invention relates generally to project management and more particularly to a dynamic project planning method (DPM) to provide a DPM project planning model and a DPM project plan.

BACKGROUND OF THE INVENTION

Before describing the dynamic planning method and system, some introductory concepts and terminology are explained. As used herein, the term "project planning method" is used to refer to a process followed to determine a project plan. The term "project planning model" as used herein, refers to a particular representation of the project planning method. Examples below of an activity pre-structured process model and of a relationship pre-structure model, associated with FIGS. 6 and 7, are illustrative examples of project planning models. The term "project planning tool" as used herein, refers to a mechanism, for example a computer program, that applies a project planning method to a project planning model.

A project planning model is a model that can be used to plan a project (e.g. a construction project). Some well-known project planning models include a dependency structure matrix (DSM), a critical path method (CPM), a precedence diagram method (PDM), a concurrent engineering technique, a critical chain technique, an overlapping framework technique, various system dynamics techniques, a simulation language for alternative modeling technique (SLAM), a graphical evaluation and review technique (GERT), a queue graphical evaluation and review technique (Q-GERT), and a program evaluation and review technique (PERT). Such conventional project planning models are thus used to plan and control projects.

Of the above methods, CPM, PDM, PERT, and GERT will be recognized to be the most common network based project planning models. A network based project planning model provides a model of a project plan having activities and time relationship linkages between the activities. The project plan database underlying the conventional project planning model will be referred to herein as conventional project plan data, having conventional project plan data elements.

In general, the term "upstream" activity will be used herein to describe an activity whose progress and work quality influence the progress and/or work quality of related succeeding activities. The upstream activity can often begin at an earlier time than the related succeeding activities. The term "downstream" activity will be used to describe the succeeding activity whose progress and work quality are influenced by the progress and/or work quality of a related upstream activity. The downstream activity can often begin at a later time than the related upstream activity. Thus, considering only two related activities of a project plan that do not occur at the same time, one is an upstream activity and one is a downstream activity.

The PDM conventional project plan data elements include a list of activities, an activity duration value for each activity, and time precedence relationships between the activities. Time precedence relationships include finish to start (FS), finish to finish (FF), start to finish (SF), and start to start (SS). An FS time precedence relationship is one for which a downstream activity is planned to start immediately upon the finish of an upstream activity. An FF time precedence relationship is one for which a two activities are planned to finish at the same time. An SF time precedence relationship is one for which a downstream activity is planned to start immediately upon the finish of an upstream activity. An SS time precedence relationship is one for which two activities are planned to start at the same time. The FS and the SF time precedence relationships are similarly described in terms of upstream and downstream activities. It will be recognized that their difference arises only in the physical sequence by which the two activities are represented on a chart, i.e. whether the downstream activity is represented above or below the upstream activity.

The time precedence relationships also can include lead or lag times. For example, when two activities are related in a FS time precedence relationship with no lead or lag, a downstream activity is planned to start at the completion of an upstream activity to which it is related. For another example, when two activities are time related in an FS relationship with lead, a downstream activity can begin a lead period before the completion of an upstream activity to which it is related. This is contrasted with an FS relationship with lag for which the downstream activity is delayed to start with a lag delay after the completion of an upstream activity to which it is related.

Contingency time buffers, also called contingency buffers, are conventionally applied to the end of one or more activities in the project plan to absorb the effect of time delay, or slippage, of individual activities. Contingency buffers attempt to ensure that the total time duration of the project is preserved even when the durations of individual activities expand, either from expected or from unexpected changes.

However, conventional contingency buffers are often inefficient. Once added to the duration of an activity, a contingency buffer can be considered by those workers performing the activity to be part of the original time schedule of the activity without distinction. When workers realize that they have extra time to complete a task, their work tends to expand to fill the perceived extra time. As a result, the contingency buffer generally does not function effectively to protect the initially planned overall schedule duration.

To the conventional project plan data elements above, PERT and GERT include various other conventional project plan data element. PERT includes probability values associated with the duration value of each activity. The probability value assigns a probability to the likelihood that an activity will be completed within its scheduled duration. PERT also adds a path probability value to each time precedence relationship. The path probability value corresponds to the likelihood that a time precedence relationship will be achieved as planned. GERT adds probabilistic time precedence relationship branching.

A project planning method provides the ability to update the project plan at any time. For an update of the project plan, the user enters new or additional project plan data into the project planning method. Conventional project planning methods use a static approach for updating the project plan. Generally, all time precedence relationships generated when the project is initially planned remain unchanged when the plan is updated. Also, only those one or more activities for which new project planning data has been obtained are updated. No update occurs for activities that are the same, or similar to, those one or more activities, even though such an update would be applicable.

Therefore, it would be desirable to provide a project planning model that has the ability to absorb time slippages and project changes yet does not tend to expand a project schedule when such slippages and changes occur. It would be further desirable to provide an approach for updating the project plan that can both alter the time precedence relationships between activities based upon updated project plan data and can identify and update activities that are the same as or similar to those for which new project plan data has been obtained.

SUMMARY OF THE INVENTION

In accordance with the present invention, a dynamic planning method (DPM) and system includes generating a list of activities and generating time precedence relationships between some or all of the activities. The DPM assigns an activity pre-structured process model to each activity, and a relationship pre-structured model to each time precedence relationship. Further activity characteristics data, activity relationship data, and policy data are provided to the model by a user. The DPM uses the activity characteristics data, activity relationship data, and policy data in association with the activity pre-structured process models and the relationship pre-structured models to generate a DPM project planning model. When dynamically updated, the DPM project planning model generates a DPM project plan. The DPM project plan includes reliability buffers. Also, when provided with updated activity characteristics data, updated activity relationship data, and/or updated policy data associated with one or more updated activities, the DPM project planning model can generate an updated DPM project plan.

With this particular arrangement a dynamic planning method (DPM) and system is provided that has the ability to generate a DPM project plan that can absorb time slippages and project changes yet does not tend to expand a project schedule when such slippages and changes occur. The DPM project planning model provides an approach for updating the DPM project plan that can both alter the time precedence relationships between activities based upon updated project plan data and can identify and update activities that are the same as or similar to those for which new project plan data has been obtained.

In accordance with another aspect of this invention, a dynamic planning apparatus includes a dynamic planning method (DPM) data processor that provides activity data which is a combination of policy data, activity characteristics data, and activity relationship data; and also includes a DPM processor coupled to the DPM data processor to process the activity data to provide a DPM project plan.

In accordance with yet anther aspect of this invention, a conventional project planning tool can provide conventional project plan data to a data transfer processor further coupled to the DPM data processor.

With this particular arrangement, the dynamic planning apparatus provides a DPM project plan that can absorb time slippages and project changes yet does not tend to expand a project schedule when such slippages and changes occur. The DPM project plan can be readily altered by a user to provide a view of the effect of such changes on the DPM project plan. The data transfer processor can accept conventional project plan data from a variety of conventional project planning tools and provide the conventional project plan data to the dynamic planning apparatus.

BRIEF DESCRIPTION OF THE DRAWINGS

The foregoing features of the invention, as well as the invention itself may be more fully understood from the following detailed description of the drawings, in which.

DETAILED DESCRIPTION OF THE DRAWINGS

Figure 1:
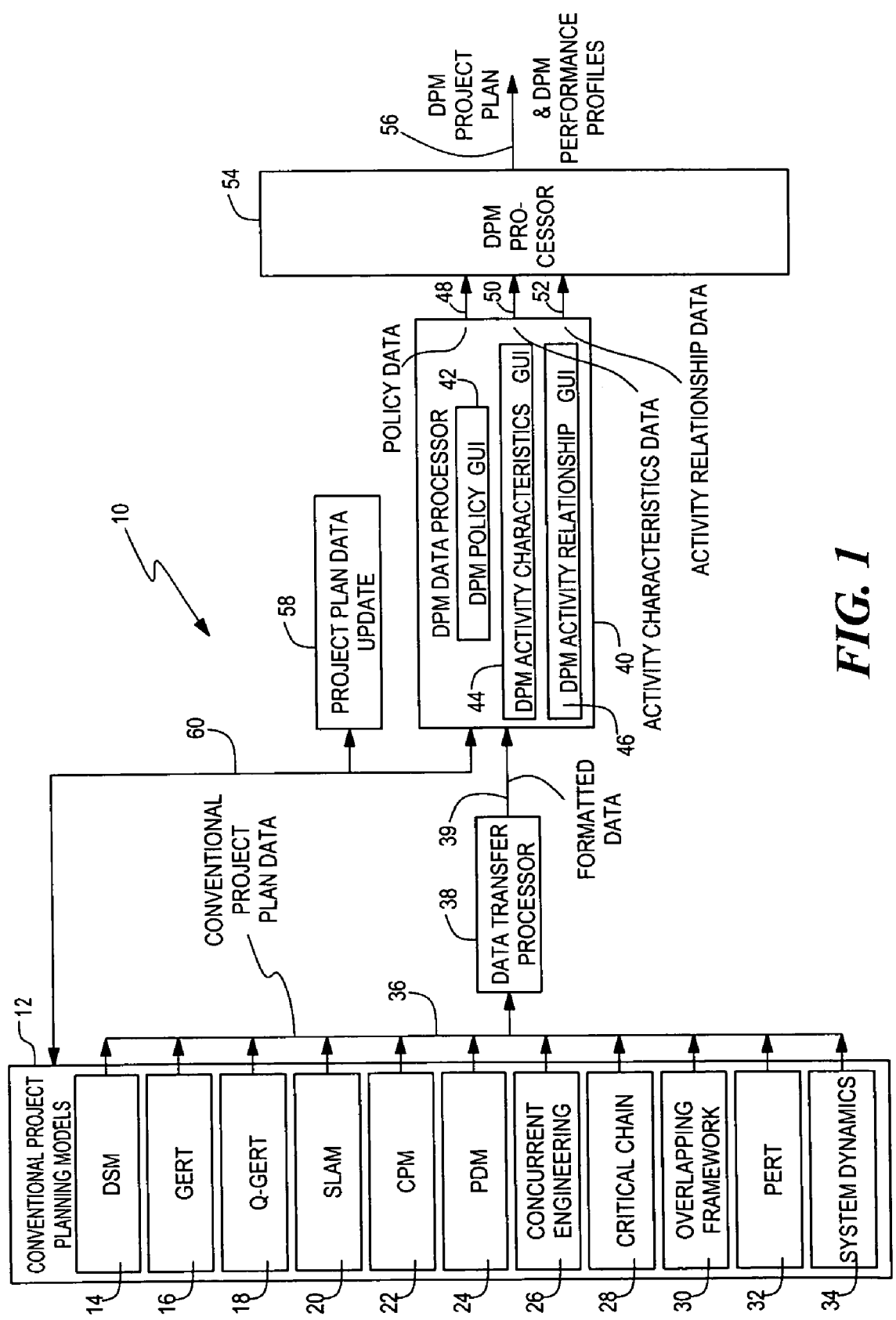
FIG. 1 is a block diagram of a dynamic planning method (DPM) project planning model.

Before describing the application of the dynamic planning method for project plan modeling, some introductory concepts and terminology are explained. In general, the term "upstream" activity will be used to describe a first activity that begins at an earlier time than a second activity. The term "downstream" activity will be used to describe the second activity that begins at a later time the first activity. Thus, considering only two activities of a project plan that do not begin at the same time, one is an upstream activity and one is a downstream activity. The terms upstream and downstream correspond only to the starting time of the activities.

Conventional project planning models have a variety of time precedence relationships between activities, also called relationships or precedence relationships. For example, time precedence relationships can be finish to start (FS), start to start (SS), start to finish (SF), and finish to finish (FF). An FS time precedence relationship is one for which a downstream activity is planned to start immediately upon the finish of an upstream activity. An FF time precedence relationship is one for which a two activities are planned to finish at the same time. An SF time precedence relationship is one for which a downstream activity is planned to start immediately upon the finish of an upstream activity. An SS time precedence relationship is one for which two activities are planned to start at the same time. The FS and the SF time precedence relationships are similarly described. It will be recognized that their difference arises only in the physical sequence by which the two activities are represented on a chart, i.e. whether the downstream activity is represented above or below the upstream activity.

These time precedence relationships can be altered with "lead" and "lag" times. A lead time corresponds to an advancement of an activity that is linked to another activity in one of the above relationships, by an amount that is equal to the lead time. A lag time corresponds to a retardation of an activity that is linked to another activity, by an amount that is equal to the lag time.

As described above, a project plan database underlying a project planning model will be referred to herein as "project plan data", having "project plan data elements". The term "activity characteristics data" will be used to describe project plan data elements that corresponds to an individual activity. For example an activity name corresponds to only one activity. The term "activity relationships data" will be used to describe project plan data elements that corresponds to two related activities. For example, time precedence relationships correspond to a time linkage between two activities. The term "policy data" will be used to describe project plan data elements that corresponds to one or more activities that can be related or unrelated. For example, a policy regarding the use of overtime labor can globally correspond to groups of unrelated activities. Activity characteristics data, activity relationship data, and policy data can be of a conventional type. However, they can also be provided in accordance with certain aspects of this invention.

Referring to FIG. 1, a system for implementing a dynamic planning method (DPM) and system 10 can include conventional project planning models 12 that generate a conventional project plan. Any one of the conventional project planning models 12, for example, DSM 14 GERT 16, Q-GERT 18, SLAM 20, CPM 22, PDM 24, Concurrent Engineering 26, Critical Chain 28, Overlapping Framework 30 PERT 32, and System Dynamics 34 can generate conventional project plan data 36. The conventional project plan data 36 is coupled to a data transfer processor 39 that formats the data to provide formatted conventional project plan data 39. The data transfer processor is coupled to a DPM data processor 40, in which the formatted conventional project plan data 39 can be altered and DPM project plan data can be added in accordance with this invention.

Alternatively, the conventional project planning models 12 need not be used. Instead all project data can be generated by the user via a DPM policy data graphical user interface (GUI) 42, a DPM activity characteristics GUI 44, and a DPM activity relationship GUI 46.

The DPM data processor 40 is coupled to the DPM processor 54. Policy data 48, activity characteristics data 50, and activity relationship data 52 are provided to the DPM processor 54. The DPM processor generates a DPM project plan 56 and DPM performance profiles 56.

Either at certain time intervals or from time to time when new information about the project is obtained, for example upon the completion of one or more activities, the user can update the DPM project plan data. A project plan data update 58 can be done either by updating the project plan data with the conventional project plan modeling models 12 and/or by updating the project plan data with the DPM policy GUI 44, the DPM activity characteristics GUI 46, and/or the DPM activity relationships GUI 48.

Figure 2:
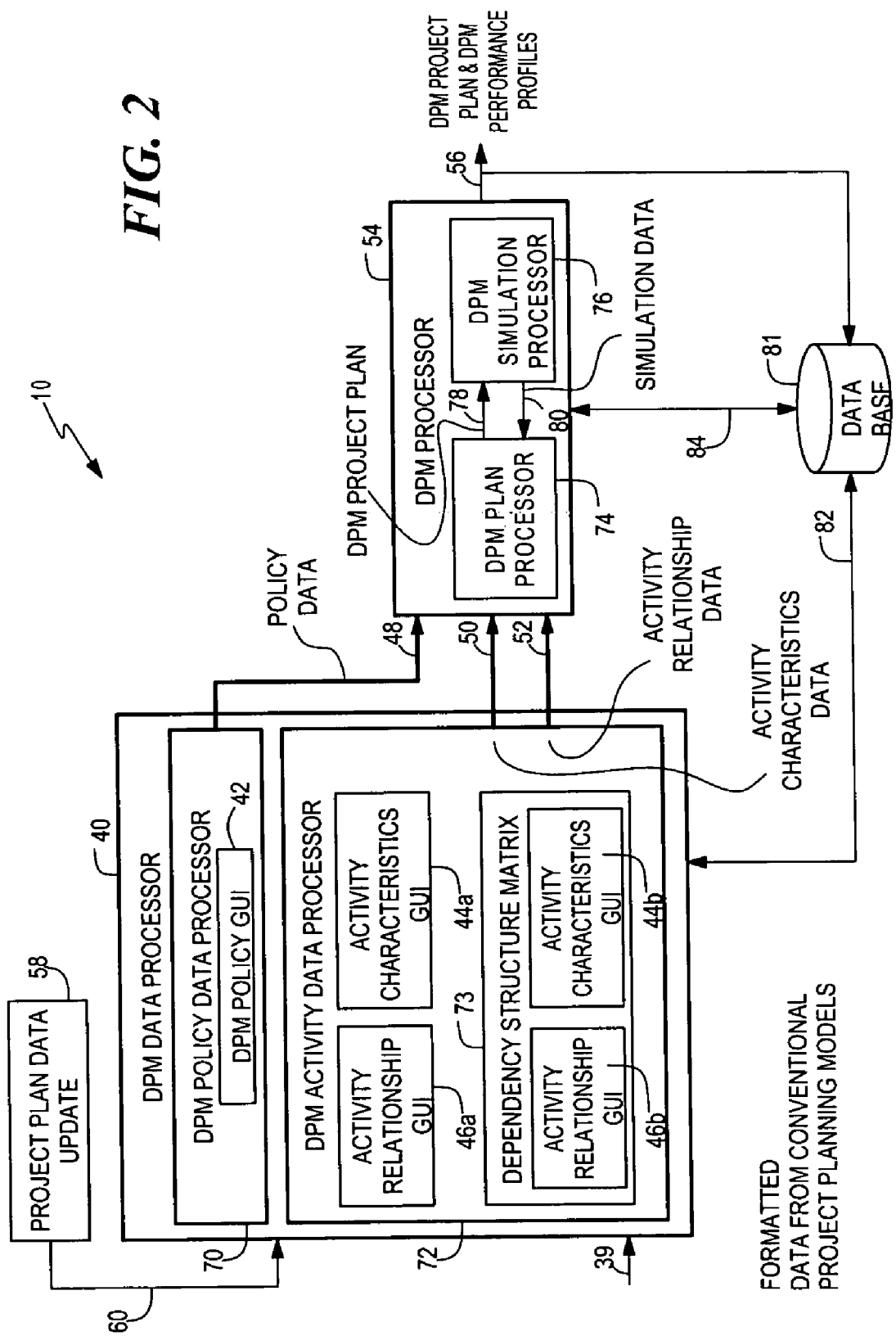
FIG. 2 is another block diagram of the DPM project planning model of FIG. 1, shown in greater detail.

Referring to FIG. 2, in which like elements of FIG. 1 are provided having like reference designations, the system 10 includes the DPM data processor 40 to which formatted data 39 from conventional project planning models can be applied. As mentioned above, the DPM data processor 40 has a variety of GUIs that can be used to either alter or add to the formatted data 39. The DPM data processor 40 includes a DPM policy data processor 70. The DPM policy data processor 70 further includes the DPM policy GUI 42. The DPM data processor 40 also includes a DPM activity data processor 72. The DPM activity data processor 72 includes a variety of GUIs to input and/or alter activity relationship data and activity characteristics data. A dependency structure matrix 73, described in greater detail below, includes an activity relationship GUI 46b and an activity characteristics GUI 44b. An activity relationship GUI 46a and an activity characteristics GUI 44a are also included, apart from the dependency structure matrix 73.

As mentioned above, formatted data 39 from conventional project planning models need not be used. Instead all project plan data can be generated by the user via the DPM policy GUI 42, the DPM activity characteristics GUI 44a, 44b and the DPM activity relationship GUI 46a, 46b.

The DPM data processor 40 is coupled to the DPM processor 54 that receives the policy data 48, the activity characteristics data 50, and activity relationship data 52. These three types of data 48, 50, 52, collectively comprising project plan data. Hereafter it is understood that project plan data comprises the policy data 48, the activity characteristics data 50, and activity relationship data 52. The project plan data 48, 50, 52 are provided to the DPM processor 54. The DPM processor 54 includes a DPM plan processor 74. The DPM plan processor 74 generates a DPM project plan 78.

In generating the DPM project plan 78, the DPM plan processor 74 applies reliability buffers. Reliability buffers are time buffers as described in U.S. patent application Ser. No. 10/068,087, entitled Reliability Buffering Technique Applied to a Project Planning Model, filed on Feb. 6, 2002, incorporated by reference herein, and assigned to the assignee of the present invention. The DPM project plan 78 is described in greater detail below. Let it suffice here to say that the DPM project plan can be presented as a graph on a computer screen, including a plurality of time bars, each associated with an activity, and each in a proper time relationship with others of the plurality of time bars.

The DPM processor 54 also includes a DPM simulation processor 76 coupled to the DPM plan processor 74. The DPM simulation processor 76 can operate upon the project plan 78 to further provide various performance profiles 56. For example, the DPM simulation processor 76 can generate a GUI on a computer screen that includes a comparison of the DPM project plan to a conventional project plan. Various DPM performance profile outputs will be described in the figures below. The DPM processor 54 generates a DPM project plan 56 and DPM performance profiles 56, also referred to herein as DPM simulation outputs.

A database 81 coupled to the DPM data processor 40, and the DPM processor 54, includes a storage device that can store and retrieve data to and from the DPM data processor 40 and the DPM processor 54. Essentially, the database 81 can store/retrieve project plan data 48, 50, 52 from/to the DPM data processor 40. The database 81 can store/retrieve the DPM project plan 56 and the various DPM performance profiles 56 from/to the DPM processor 54.

As described above, the project plan data 48, 50, 52 can be updated from time to time or as project plan data updates 58 are obtained.

Figure 3:
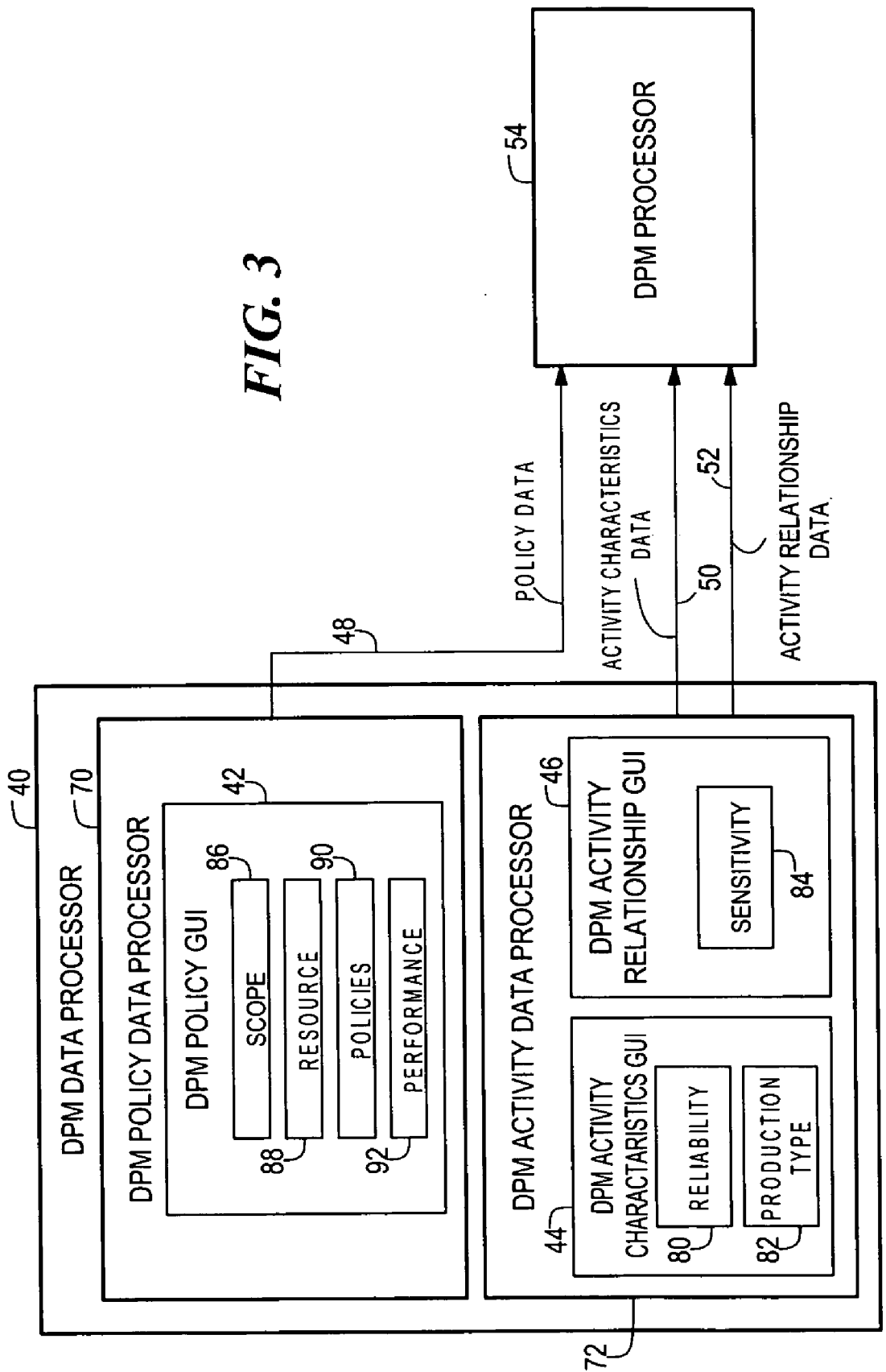
FIG. 3 is a block diagram of the DPM data processor and the DPM processor of FIGS. 1 and 2, showing various graphical user interfaces (GUIs) in greater detail.

Referring now to FIG. 3, for which like elements of FIGS. 1 and 2 are again shown having like reference designations, the DPM data processor 40 provides GUIs that incorporate data types in accordance with this invention. The DPM activity characteristics GUI 44 incorporates an activity reliability value 80. The activity reliability value 80 describes both the likelihood that the activity achieves the planned duration and schedule, and the likelihood that the output work product of the activity will be of sufficient quality so as not to impact the schedule of downstream activities. It will be understood that the activity reliability value is associated with an activity rather than a relationship between activities.

The DPM activity characteristics GUI 44 also incorporates a production type value 82. The activity production type value 82 describes the speed of an activity in relation to normal production rate for the activity. For example, the activity can normally require a duration value of two months, whereas it may be initially planned for a one month duration. This illustrative activity is planned having a fast production rate value. It will be understood that the activity production type value is also associated with an activity rather than a relationship between activities.

The DPM activity relationship GUI 46 incorporates an activity sensitivity value 84. The activity sensitivity value, or generally the sensitivity, is a value that describes the strength of the coupling from a given downstream activity to an upstream activity with which it is associated by a time precedence relationship. For example, two activities in a FS relationship can be strongly or weakly coupled via the downstream sensitivity value. A strong coupling requires that a downstream activity cannot be started until the finish of the given activity. A weak coupling implies that the downstream activity can start before the completion of a given activity, though they are linked in a FS relationship. Essentially, the downstream sensitivity value can effect lead and lag durations. Since a downstream activity can have time precedence relationships with a number of upstream activities, the downstream sensitivity values are most closely associated with the time precedence relationships of a downstream activity, rather than with the downstream activity itself.

The DPM policy GUI 42 incorporates various policy data values 86, 88, 90, 92. Policy data values can include project policies such as manpower availability versus time values (i.e. a type of resource values 88), overtime and flexibility of worker headcount control values i.e., a type of scope values 86), a buffering policy (i.e., a type of policies values 90), thoroughness of quality control values (i.e., a type of performance values 92), hiring time control values (i.e., a type of scope values 86), and request for information (RFI) time control values (i.e., a type of policies values 90). The buffering policy as used above should be understood to correspond to a policy that allows the user to apply time buffers, other than reliability buffers (e.g. contingency buffers), to a project schedule.

Though particular data values are indicated, it should be recognized that various other data values can be generated with the three GUIs 42, 44, 46. In particular, conventional data values can also be generated. For example, the activity time precedence relationship, a type of activity relationship data, can be generated with the DPM activity relationship GUI 46.

DPM project plan data comprising policy data 48, activity characteristics data 50, and activity relationship data 52 are provided to the DPM processor 54.

Figure 4:
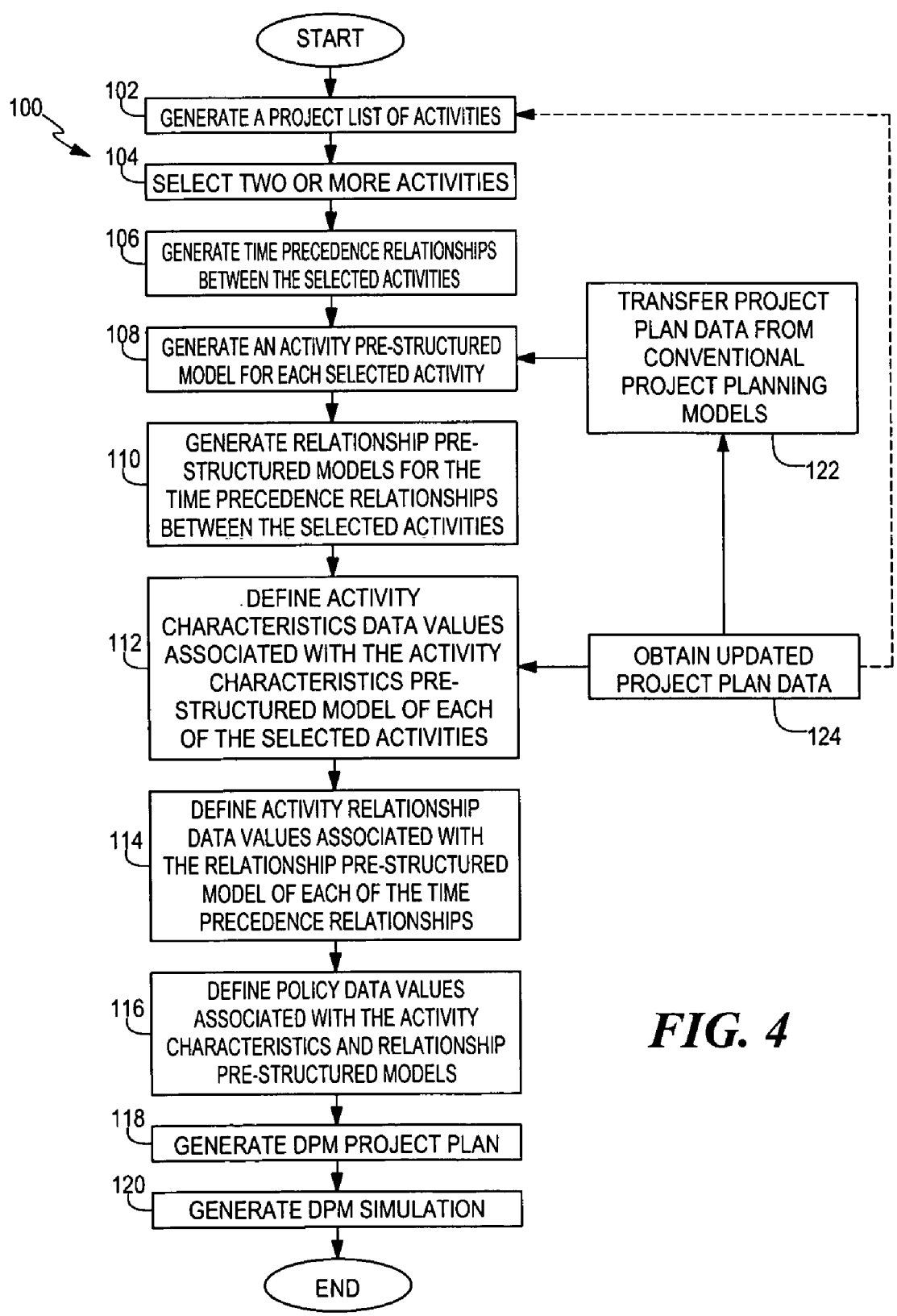
FIG. 4 is a flow chart showing the process of the DPM project planning model.

Referring now to FIG. 4, a DPM process begins at step 102 in which the user generates a list of activities to be performed in a project. It should be recognized that the activities can be any granularity chosen by the user. For example, activities that are generated to construct a building can have a low granularity such as "install the roof". The activities can also have a high granularity such as "install the first roof member", "install the second roof member", etc. At step 104, two or more activities are selected from among the various project activities. In general, all of the project activities will be selected. At step 106, initial time precedence relationships are generated to describe the time relationship between the two or more activities. It should be noted that all activities of a project are time related in some way. Some activities are indirectly related via other activities. Some activities are in direct time relation. The time precedence relationships generated at step 106 are for activities that are in direct time relationship.

At step 108, an activity pre-structured process model is generated for each selected activity. It should be noted that though the model of the activity is pre-structured, the various parameters that are discussed below that describe the structure are altered by the DPM plan processor (74 of FIG. 2), in accordance with the DPM project plan data values. The activity pre-structured process model is described in greater detail below.

At step 110, a relationship pre-structured model is generated for each time precedence relationships generated above at step 106. As above, it should be noted that though the model of the activity relationship is pre-structured, the various parameters that are discussed below that describe the structure can be altered by the DPM plan processor (74 of FIG. 2) in accordance with the DPM project plan data values. The relationship pre-structured model is described in greater detail below.

At step 112 the activity characteristics data values are defined in association with each activity and the activity pre-structured process model is further defined in accordance with the activity characteristics data values. Activity characteristics data values can be both conventional activity characteristics data values and can be those provided in accordance with this invention.

At step 114, the activity relationship data values are defined in association with each activity time precedence relationship and the relationship pre-structured model is further defined in accordance with the activity relationship data values. Activity relationship values data can be both conventional activity relationship data values and can be those provided in accordance with this invention.

At step 116, the policy data values are defined in association with each activity time precedence relationship and/ with each activity. The activity pre-structured process model and the relationship pre-structured model are further defined in accordance with the policy data values. As described earlier, policy data values can be associated either with activities or with activity time precedence relationships, and for either activities that are unrelated or related. Policy data values can be both conventional policy data values and can be those provided in accordance with this invention. The activity characteristics data values, the activity relationship data values, and the policy data constitute the project plan data.

At step 118, a DPM project plan is generated. For example, the DPM project plan can be presented graphically in a GUI as plurality of time bars on a time scale, for which each time bar length represents a time period during which an activity is planned to occur. The DPM project plan is described in greater detail below. As mentioned above, the DPM project plan can include reliability buffers.

At step 120, optionally, DPM simulations can be generated. DPM simulations are described in greater detail below.

Alternatively, at step 122, as described in association with FIGS. 1 and 2, formatted conventional project plan data can be transferred from one of a variety of conventional project planning models. Among other data, the conventional project plan data includes time precedence relationship data. The conventional project plan data is provided to step 108, whereupon the process proceeds as described above.

Beginning at step 124, the DPM project plan generated at step 118 can be updated. At step 124, updated project plan data can be obtained. For example updated schedule forecast data can be obtained from the workers. Updated data is obtained at selected time intervals or from time to time as new project data become apparent, for example at the completion of an activity at a time that does not match the existing project plan. The updated project plan data obtained at step 124 is provided to the process at step 112, whereupon the process proceeds as described above. It should be recognized that the updated project plan data can be associated with some or with all of the project activities described at step 102. Optionally, the updated project plan data can include one or more new activities and the updated project plan data associated with those new activities is provided to the process at step 102. The updated project plan data is used to generate an updated DPM project plan at step 118 and, optionally, to generate updated DPM simulations at step 120.

During the update, at step 118 in which the DPM project plan is generated, the DPM plan processor (74, of FIG. 2) can identify those activities that have similar characteristics to those being updated, and update those similar activities automatically. For example, if an activity "pour concrete" is updated, beginning at step 124, to indicate actual start and finish dates that do not correspond to an initially planned duration, all other activities named "pour concrete" and with similar project plan data can be automatically updated to have the updated duration. The DPM plan processor (74 of FIG. 2) can determine which activities named "pour concrete" are similar to that activity for which new project plan data was directly entered by the user. Similarity is established by a number of criteria, including, but not limited to, the same initially planned duration values.

Figure 5:
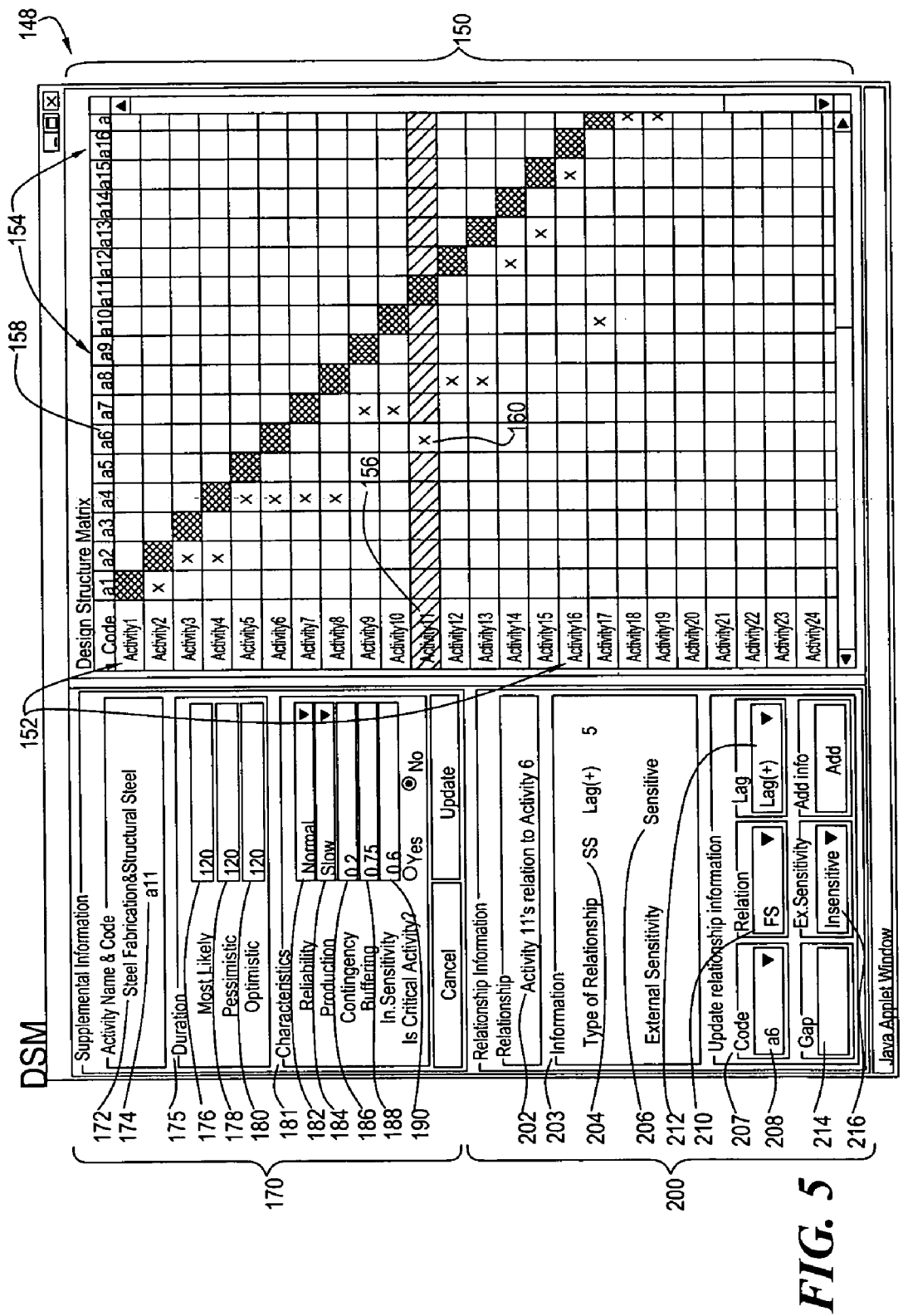
FIG. 5 is an illustrative GUI of a dependency structure matrix (DSM) including an activity characteristics graphical user interface (GUI) and an activity relationship GUI.

Referring to FIG. 5, a pictorial of a GUI 148 includes a dependency structure matrix (DSM) 150. The DSM provides two axes 152, 154, each of which list the project activities. In this exemplary example, the vertical axis 152 list activity1 though activity24. The horizontal axis lists activities a1 though a16 corresponding to activity1 through activity16 respectively. Time precedence relationships can be seen by the X's, of which X 160 is one example. The X 160 indicates that there is a time precedence relationship between activity11 156 and activity6 (a6) 158. Similarly, a variety of other time precedence relationships are indicated by other X's.

The GUI further includes an illustrative activity characteristics GUI 170. When a particular time precedence relationship is selected on the DSM 150 with a mouse or other pointing device, the activity characteristics GUI 170 provides information about the activity indicated in the column 152, here activity11 156.

The activity characteristics GUI 170 provides the user with the ability to view and/or modify activity characteristics data. The activity characteristics GUI 170 includes an activity name 172 and an activity code 174. A duration selection box 175 provides the user with the ability to select a most likely duration value 176, a pessimistic duration value 178, and an optimistic duration value 180. An activity characteristics selection box 181, provides the user with the ability to select the activity reliability value 182, the activity production rate value 184, a contingency value 186, a buffering value 188 and a sensitivity value 190.

As described above, the activity reliability data value describes the likelihood that the activity, here activity11 156, will meet it planned time schedule with sufficient quality. Also as described above, the production rate value 184 describes the scheduled duration of the activity in relation to a historical average rate for similar activities.

The contingency value 186 describes a contingency buffer or time percentage increase that can be applied by the user to all activities. The buffering value 188 describes a time percentage increase or decrease that can be applied by the user to all reliability buffers. The sensitivity value 190 describes the sensitivity value described above and associated with an activity relationship.

The activity relationship GUI 200 provides the user with the ability to view and/or modify activity relationship data corresponding to a time precedence relationship. In this illustrative example, the activity relationship 160 is selected with a mouse or other pointing device. The activity relationship 160 is associated with activity11 156 and a6 158. The activity relationship GUI 200 provides a text representation 202 of the relationship selected, here "activity11's relationship to activity6".

The relationship GUI 200 also provides an information box 203, wherein the type of relationship 204 and the external sensitivity value 206, referred to elsewhere as the sensitivity, are displayed to the user. The relationship GUI 200 further provides an update relationship information box 207 in which the user can select a code 208 corresponding to a selection of a time precedence relationship. With the code box 208, new time precedence relationships can be generated, whereupon they will appear as X's in the DSM 150. The update relationship box 207 also provides the user with the ability to view or alter a type of time precedence relationship value 210, a lag value 212 (which can be a lead value depending upon the sign of the value), and the sensitivity value 216, which is also displayed at 206.

It will be recognized by one of ordinary skill in the art that where this illustrative example of a GUI 148 provides a DSM 150 for which the list of activities is provided as a column 152 and a row 154 that indicate activities by abbreviated nomenclature, it is equally possible to list the entire activity name in the column 152 and the row 154. It should be further recognized that any arrangement of the values within the activity characteristics GUI 170 and the activity relationship GUI 200 is possible with this invention. It should be further recognized that other data values can be provided with the illustrative GUI 148.

The illustrative GUI 148, with the associated DSM 150, activity characteristics GUI 170 and the activity relationship GUI 200 can be used to enter or alter project plan data and project plan activities.

In general, a process model can be represented in the form of stocks and flows. A stock is a gathering point at which some item accumulates. A flow can be considered to be a valve with variable rate through which tasks are performed at the variable rate upon the issuing from the flows. In the discussions that follow, it should be understood that an activity can include a variety of tasks. Recalling from above discussions that an activity can be at any level of granularity, and remembering that the activities are those that are presented as time bars in the DPM project plan, each activity can include a variety of tasks at higher granularity, not included as time bars on the DPM project plan.

Figure 6:
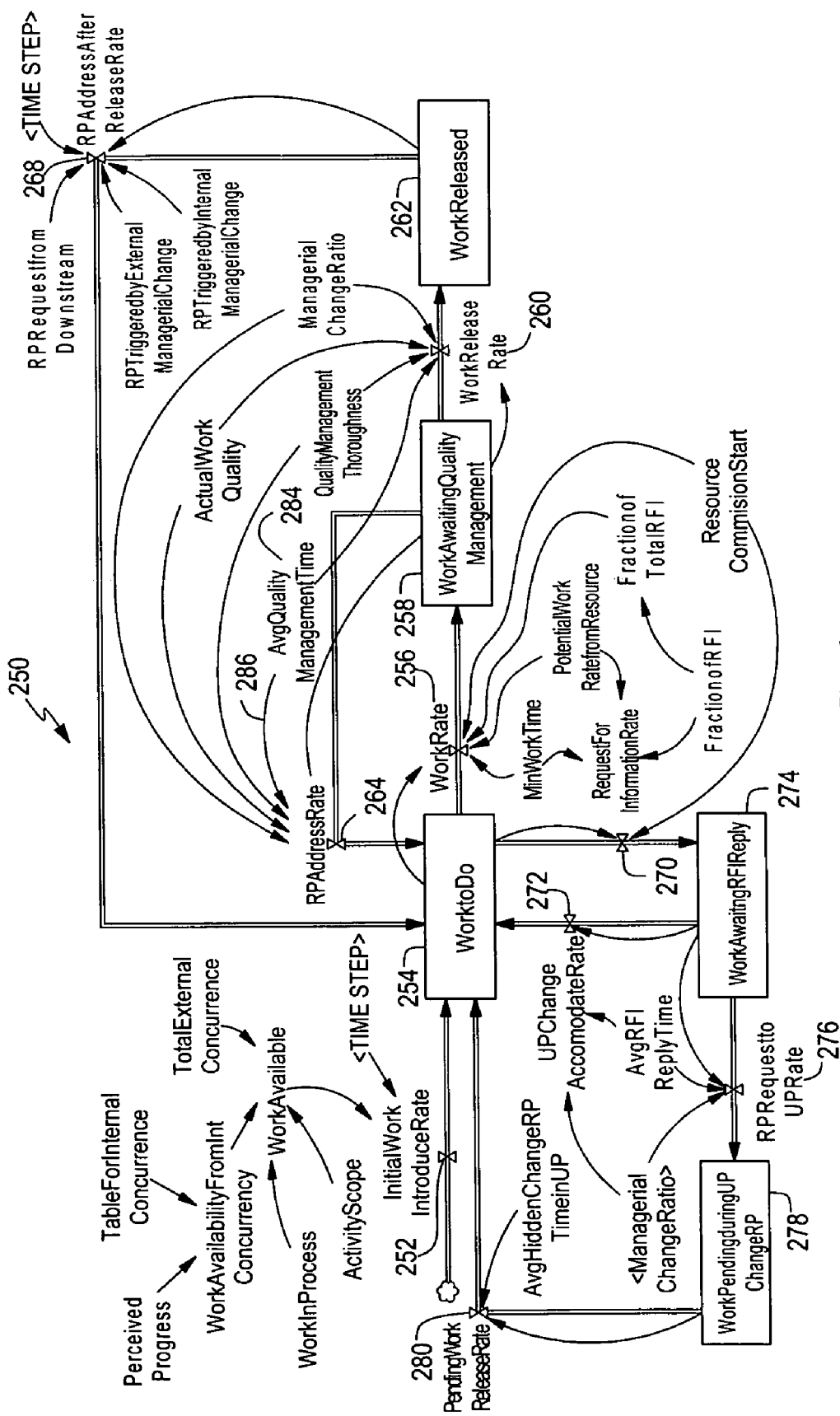
FIG. 6 is chart showing an illustrative example of an activity pre-structured process model associated with one activity of a project plan.

Referring now to FIG. 6, an illustrative example of the activity pre-structured process model 250 includes a variety of flows, represented by valves, a variety of stocks, represented by rectangles, and a variety of feedbacks, represented by arcs. In general, in the illustrative pre-structured process model 250, feedbacks represent mathematical functions, that relate stocks and flows through variables. The variables are indicated as names within the various arcs. The illustrative example shows many specific feedbacks with many corresponding mathematical functions, many specific stocks, many specific flows, and many variables. However, it should be recognized that a variety of feedbacks and mathematical functions can be used with this invention.

In the activity pre-structured process model 250, workflow during construction is represented as tasks flowing into and through five primary stocks, WorktoDo (WtDo) 254, WorkAwaitingQualityManagement (WaQM) 258, WorkReleased (Wrel) 262, WorkAwaitingRFIReply (WaRRep) 274, and Work PendingduringUpchangeRP (WpURP) 278. Available tasks at a given time are introduced into the stock of WorktoDo 254 through the flow InitialWorkIntroduceRate (iWiR) 252. The introduced tasks are completed through the flow WorkRate (WR) 256, unless changes occur in the upstream work. The completed tasks, then, accumulate in the stock, WorkAwaitingQualityManagement 258 where the work output waits to be monitored or inspected. Depending on the work quality, some completed tasks are either returned to the stock of WorktoDo 254 through RP AddressRate (RPaR) 264 or released to the downstream work through WorkReleaseRate (WrR) 260. In addition, released tasks in the stock WorkReleased 262 can be returned to the stock of WorktoDo 254 through RPAddressAfterReleaserate (RPaaR) 268 for various reasons including work product error found either late or by an activity downstream from that of the activity pre-structured process model 250. Alternatively, if work upstream from the activity pre-structured process model 250 is identified to have errors during a checking period, corresponding tasks flow from WorktoDo (WtDo) 254 to the stock WorkAwaitingRFIReply (WaRRep) 274 through RequestForInformationRate (RFIR) 270, UpChangeAccommodateRate (UCaR) 272, RPRequesttoUpRate (RPrUR) 276 and PendingWorkReleaseRate (pWrR) 280.

The five primary stocks 254, 258, 262, 274, 278 can be described using differential equations listed below, and as further described in FIGS. 7-10. In order to simulate a variable number of project activities, the equations in the dynamic project model are represented using two-dimensional subscripts as indicated below.

$$(d/dt)(WtDo[i]) = iWiR[i] + \text{sum}_{j=1...n}(pWrR[ij]) + \text{sum}_{j=1...n}(UCaR[i,j]) + RPaR[i] + RPaaR[i] - \text{sum}_{j=1...n}(RFIR[ij]) - WrR[i]$$

$$(d/dt)(WaRRep[i,j]) = RFIR[i,j] - UCaR[ij]$$

$$(d/dt)(WpURP[i,j]) = RPrUR[ij] - pWrR[i,j]$$

$$(d/dt)(WaQM[i]) = WR[i] - WrR[i] - RPaR[i]$$

$$(d/dt)(Wrel[i]) = WrR[ni] - RPaaR[i],$$

where i=activity, j=preceding, and i,j ∈ {1,2,3 . . . , n}.

It should be recognized that the variables, of which variable 284 is but one example, the functions represented by arcs, of which arc 286 is but one example, the stocks, of which stock 258 is but one example, and the flows, or which flow 264 is but one example, are associated with the DPM project plan data. Remembering that the DPM project plan data comprises policy data values, activity characteristics data values, and activity relationship data values, the DPM project plan data can be associated with the functions, for example function 286, to alter the characteristics of the activity pre-structured process model.

While the activity pre-structured process model 250 shows a model of a single activity, it should be understood that a pairs of such activity pre-structured process models can be linked, as will be described blow, to provide a relationship pre-structured model.

The illustrative activity pre-structured process model 250 can also be used to quantify changes to an activity that can occur at the time of a project plan update. Project plan updates are discussed above in association with FIGS. 1-2. As mentioned above, project plan updates can occur at any time or on a particular time schedule. At a project plan update, new data can be entered in to the project plan. New project plan data can arise due to a variety of circumstances. For example, a particular activity may have finished earlier than originally anticipated. Thus, the duration value associated with that activity can be changed by the user at a project plan update. For another example, an error may have occurred in the work associated with a particular activity. When an error occurs, the effect on the project can effect only that particular activity, or the effect may cause changes to other activities. For yet another example, a management decision can occur to change an activity. A management change can also be contained within one activity, or the effect can ripple to other activities.

In general, project plan updates can correspond to intended or unintended changes. Intended changes correspond to management decisions in a variety of circumstances. Unintended changes occur due to error or due to incorrect initial planning. The activity pre-structured process model 250 is examined below for how it behaves when a project plan change and a corresponding update is made.

Figure 7:
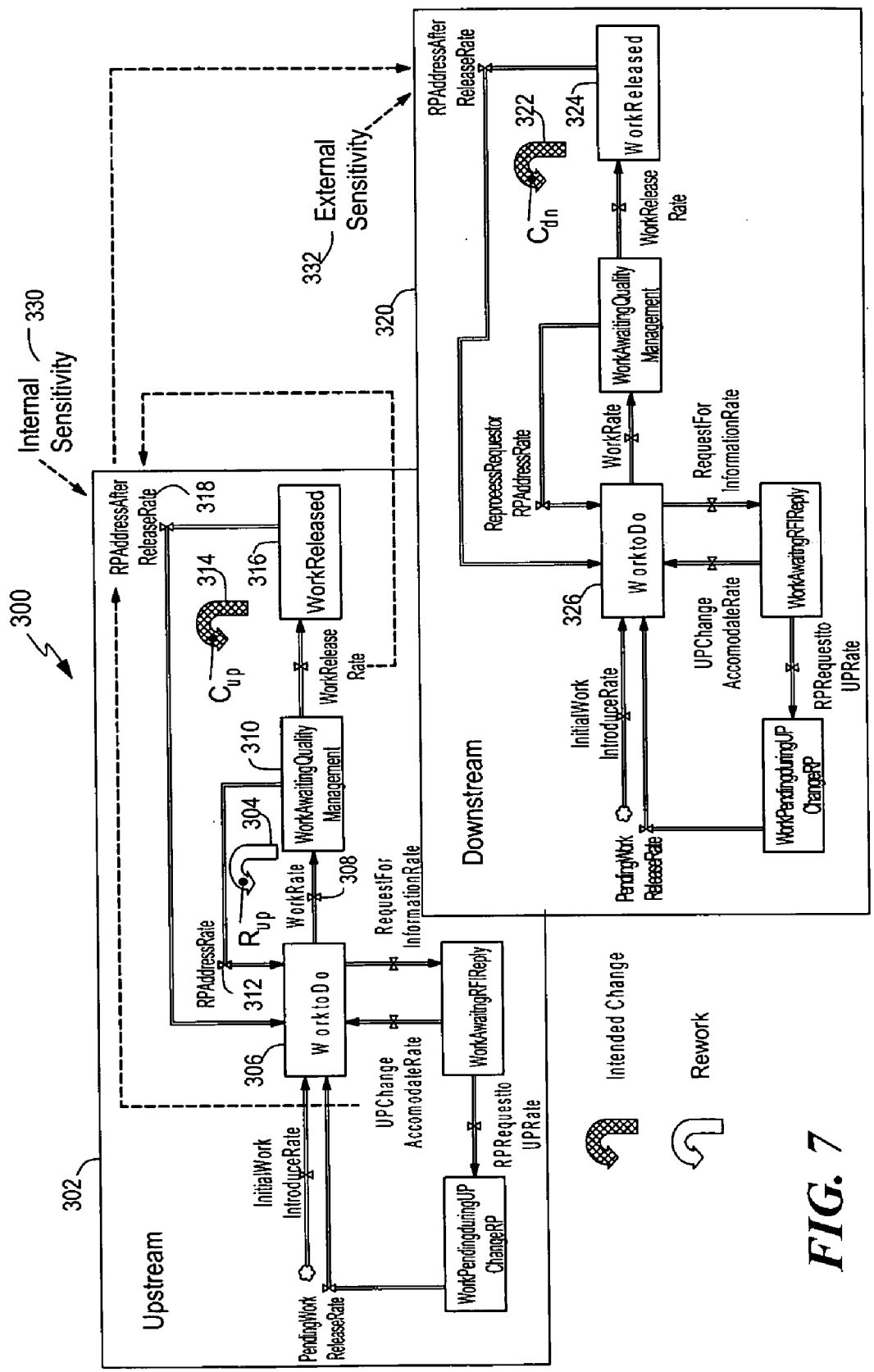
FIG. 7 is chart showing an illustrative example of a relationship pre-structured model between two activities, and indicating the impact of intended changes thereupon.

Referring now to FIG. 7, an illustrative example of a relationship pre-structured model 300 associated with a management change, or intended change, includes an upstream activity that has an activity pre-structured process model 302, corresponding to the activity pre-structured process model of FIG. 6. A first type of managerial, or intended, change 304 is generated when work is release from the stock WorktoDo 306 through the flow WorkRate 308 to the stock WorkAwaitingQualityManagement 310. Where an intended change is desired, a management decision can be made to return the work though the flow RPaddressRate 312 to the stock WorktoDo 306, whereupon the work is re-done.

Alternatively a second type of managerial change 314 can be made. If the work product arrives after quality management at the stock WorkReleased 316, an intended change can be made, through a management decision, to return the work through the flow RPAddressafterReleaseRate 318 back to the stock WorktoDo 306, whereupon the work is re-done.

In the first and second types of managerial changes above, the impact on a downstream activity 320 can be minimal or non-existent. In both instances, the changes can be contained within the upstream activity 302 by the upstream workers. However, if the change is made late in the process of performing the upstream activity, for example the change 314, the change can impact the downstream activity. For example, the change 314 to the upstream activity can cause a corresponding change 322 in the downstream activity, where downstream tasks completed as part of the downs stream activity 320 and in WorkReleased 324 must be sent back to WorktoDo 326.

Management changes that can be contained within one activity will be referred to as having "internal" sensitivity (see e.g., internal sensitivity 330) hereafter, and management changes in one activity that cause resulting changes in other activities will be referred to hereafter as having "external" sensitivity (see.e.g., external sensitivity 332).

Figure 8:
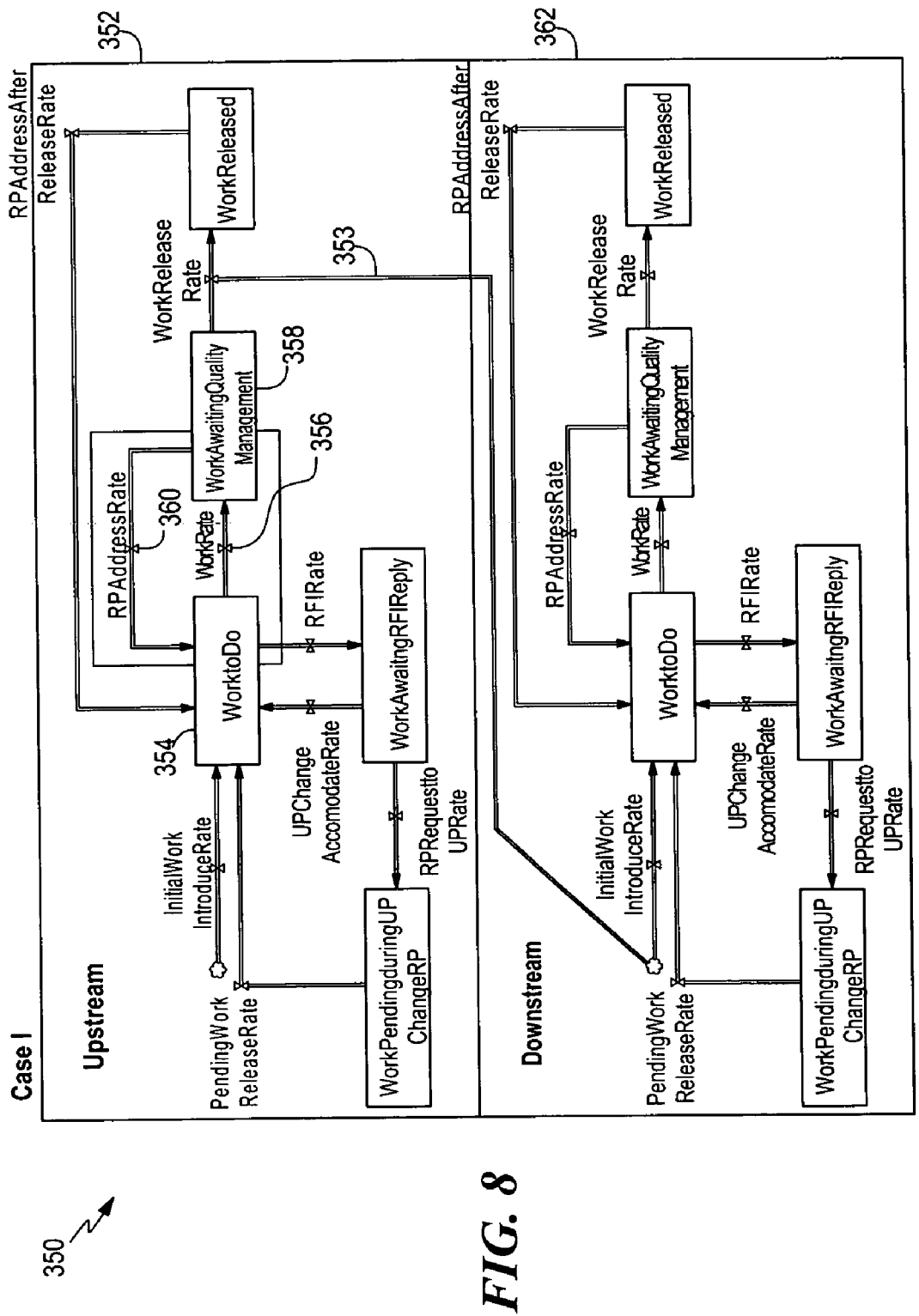
FIG. 8 is a chart showing another illustrative example of a relationship pre-structured model between two activities and indicating the impact of a first case of unintended changes thereupon.

Referring now to FIG. 8, a chart of a first illustrative case example of a relationship pre-structured model 350 associated with a non-management, or unintended, change includes an upstream activity and a downstream activity that each have an activity pre-structured process model 352, 362 corresponding to the activity pre-structured process model of FIG. 6. A relationship path 353 provides upstream work product to the downstream activity 362.

Here, the unintended error is found early by the upstream workers. As in the illustrative example of managerial change above, WorktoDo 354 is released through the flow WorkRate 356 to the stock WorkAwaitingQualityManagement 358. If the work quality not sufficient, the work is returned though the flow RPAddressRate 360 to the stock WorktoDo 354, whereupon the work is re-done. As this work error was found early in the process, i.e. within the upstream activity pre-structured process model 352, there is no impact to the downstream activity 362.

For a yet more detailed description corresponding to the first illustrative first case example, assume that before starting a downstream activity of laying floor tiles, it is found that the floor slab was constructed in error by the preceding upstream activity and upstream activity workers. As a result, the tile work of the downstream activity cannot properly proceed. In this case, the upstream workers can correct the floor slab as soon as the error is found. Thus, the impact to the downstream activity, laying floor tiles, is not impacted.

Figure 9:
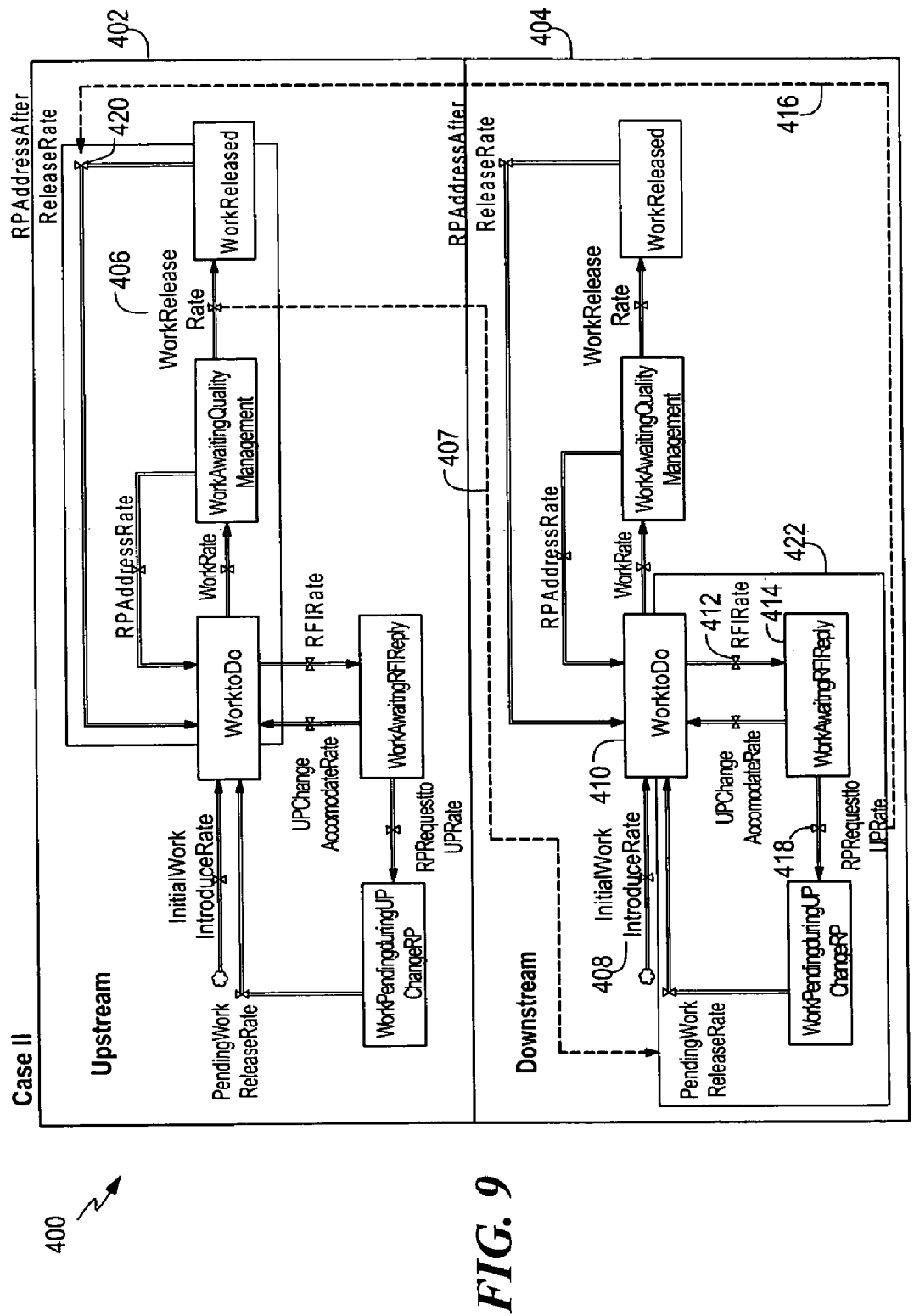
FIG. 9 is a chart showing yet another illustrative example of a relationship pre-structured model between two activities and indicating the impact of a second case of unintended changes thereupon.

Referring now to FIG. 9, a second illustrative case example of a relationship pre-structured model 400 associated with a non-management change, or unintended change, includes an upstream activity and a downstream activity that each have an activity pre-structured process model 402, 404 corresponding to the activity pre-structured process model of FIG. 6. A relationship path 407 provides upstream work product to the downstream activity 404. Here, the unintended change, or error, has been found in the early part of box 422 of the downstream activity 404. Work that is sent on a path 407 from WorkReleasedRate 406 of the upstream activity through InitialWorkIntroduceRate 408 to WorktoDo 410 of the downstream activity is found to be in error by the downstream workers. The work product is then sent through the flow RequestforInformationRate (RFIRate) 412 to the stock WorkAwaitingRFIReply 414. Where changes are then requested to the upstream work product to be performed by the upstream workers, a feedback path 416 is established by which the upstream workers are requested at a rate RPRequesttoUPRate 418 to reprocess the upstream work through the rate RPAddressafterReleaseRate 420. Corrected work later flows on the path 407 from the upstream activity to the downstream activity.

It should be recognized that where the activity relationship sensitivity value, described earlier, is a low sensitivity value, then the impact upon the downstream activity from changes such as those of the second illustrative case example 400, are minimal. It should be recognized that the stocks and flows within the box 422 correspond to a reliability buffer that is associated with the beginning of the downstream activity pre-structured process model 404. The reliability buffers are described above.

Figure 10:
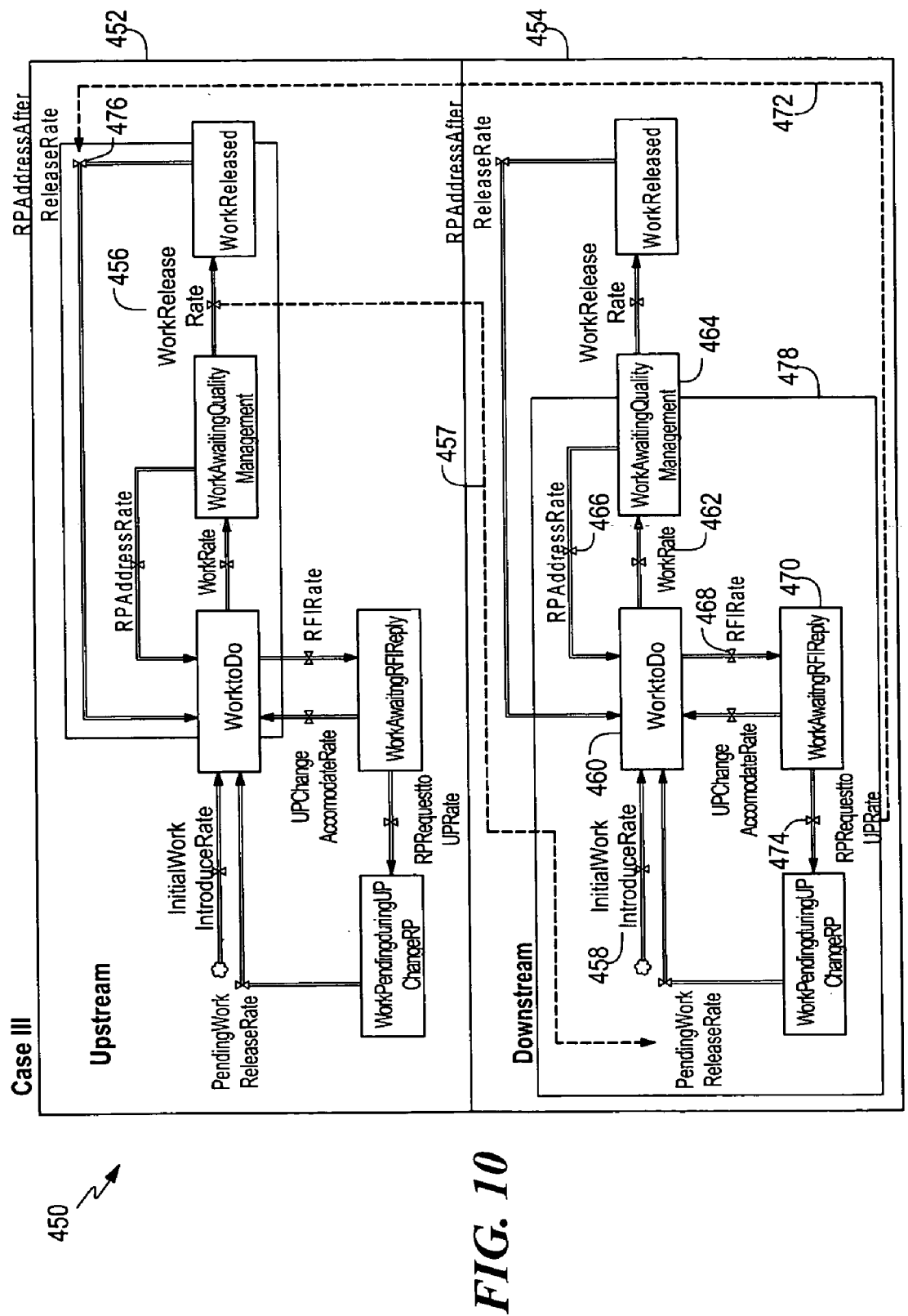
FIG. 10 is a chart including yet another illustrative example of a relationship pre-structured model between two activities and indicating the impact of a third case of unintended changes thereupon.

Referring now to FIG. 10, a third illustrative case example of a relationship pre-structured model 450 associated with a non-management change, or unintended change, includes an upstream activity and a downstream activity that each have an activity pre-structured process model 452, 454 corresponding to the activity pre-structured process model of FIG. 6. A relationship path 457 provides upstream work product to the downstream activity 454. Here, the unintended change, or error, has been found in a later part of the downstream activity 454. Work product is sent on a path 457 from WorkReleasedRate 456 of the upstream activity through InitialWorkIntroduceRate 458 to WorktoDo 460. The work of the downstream activity progresses through the flow WorkRate 462 to the stock WorkAwaitingQuality Management 464 before the error in the upstream work product is found. The downstream work product then must be returned through the flow RPAddressRate 466 to WorktoDo 460. The downstream work product then progresses through the flow RFIRate 468 to WorkAwaitingRFI Reply 470. A request is made to the workers of the upstream activity through the flow RPRequesttoUPRate 474 back along the feedback path 472 to the flow RPAddressafterReleaseRate 476, whereupon the upstream work product is sent back to re-process. This total feedback path is longer than that of the second illustrative case example above, thus, it is expected that this later found error will result in greater schedule impact.

It should be recognized, as in the prior illustrative case example, that where the activity relationship sensitivity value, described earlier, is a low sensitivity value, then the impact upon the downstream activity from changes such as those of the third illustrative case example 450, are minimal. It should be recognized that the stocks and flows within the box 478 correspond to a reliability buffer that is associated with the beginning of the downstream activity pre-structured process model 472.

The three illustrative case examples of FIGS. 8-10 are provided herein to show the relationship pre-structured model behaviors in different cases of project changes corresponding to project plan updates. In particular, these three case examples show that the later that an unintended change is discovered, the greater the impact on the downstream activities and on the overall project schedule.

Figure 11:
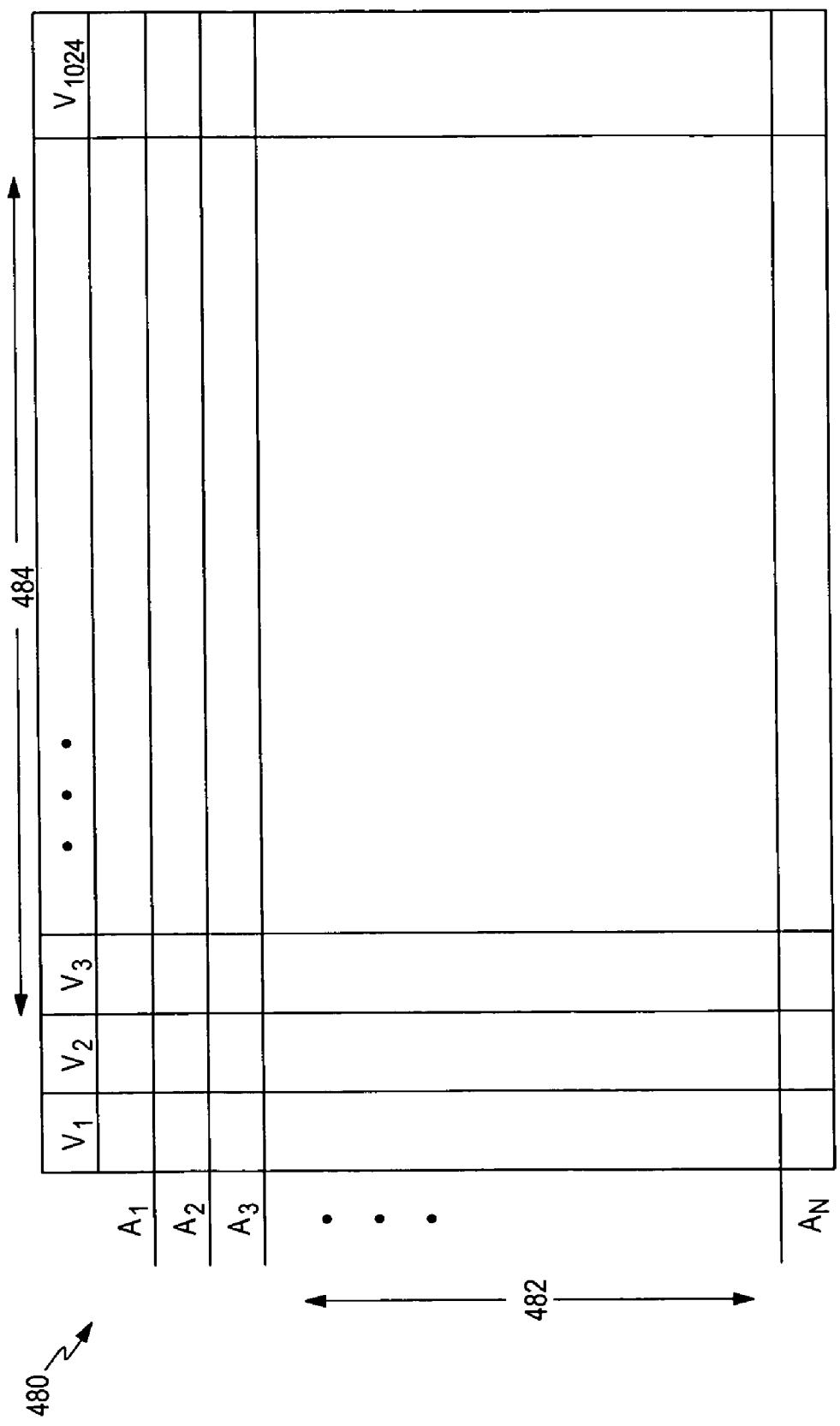
FIG. 11 is a chart including a data matrix corresponding to the activity characteristics data and the activity relationship data associated with the activities of a project plan.

Referring now to FIG. 11, an illustrative chart 480 includes a vertical axis 482 along which is listed the project activities, and a horizontal axis 484 along which is listed the various project plan data elements, comprising activity characteristics data, activity relationship data, and policy data. Thus, FIG. 11 illustrates that project activities and project plan data associated therewith can be expressed as a matrix of values. The chart 480 can include some or all DPM project plan data. It should be understood that the project plan data is associated with the activity pre-structured process model of FIG. 6 and the relationship pre-structured models of FIGS. 7-10 through a variety of mathematical functions.

Figure 12:
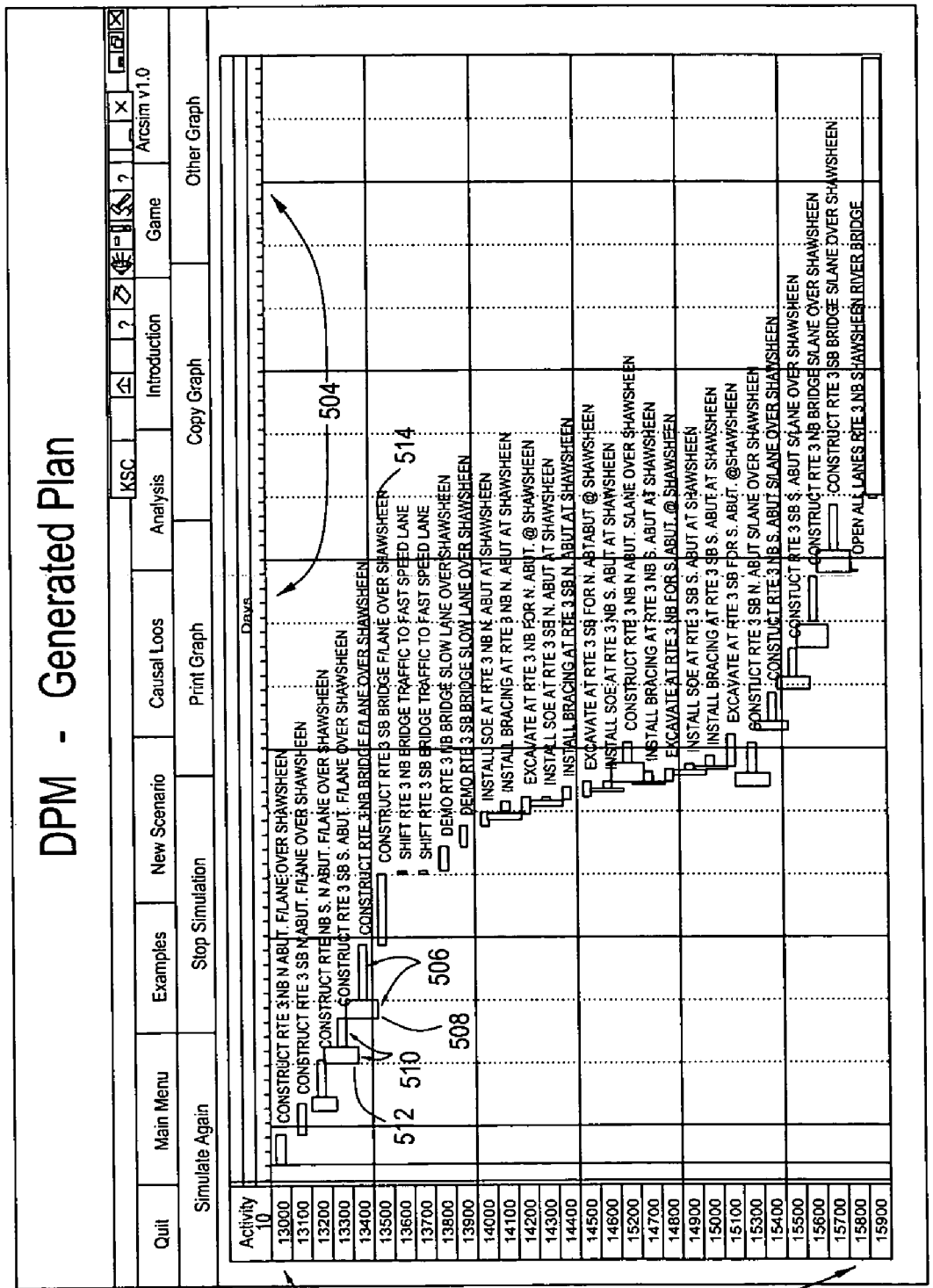
FIG. 12 is a graphical user interface (GUI) including an illustrative example of a DPM project plan.

Referring now to FIG. 12, an illustrative GUI 500 of a DPM project plan includes a vertical axis 502 that corresponds to activities and a horizontal axis 504 that corresponds to time in days. Various activities, of which activities 506 and 510 are but two examples, are shown as time bars, the length of which corresponds to a duration value, one of the various activity characteristics data values described above. A downstream activity 506 is related in a FS relationship with an upstream activity 510. Each of these activities 506, 510 has a corresponding reliability buffer 508, 512, respectively. Activity names are provided on the illustrative GUI 500, for which activity name 514 is but one example.

The illustrative GUI 500 of a DPM project plan can provide a view with which a user can visually understand the time at which project activities, for example activities 506, 510, are to be performed or have been performed. While the time scale 504 is shown in generic days, it will be recognized that a real time schedule in days, with the dates of the year shown, can be provided by this invention.

It is to be understood that when the project plan is updated by the entry of new project plan data, the duration value associated with some or all of the time bars may change. The DPM project plan may change accordingly. It will be further understood, that the time precedence relationship lead and/ or lag values can change when the project plan is updated. The aforementioned U.S. patent application Ser. No. 10/068, 087, entitled Reliability Buffering Technique Applied to a Project Planning Model, describes the changes that can occur to the various time precedence relationships as a project plan is updated.

Figure 13:
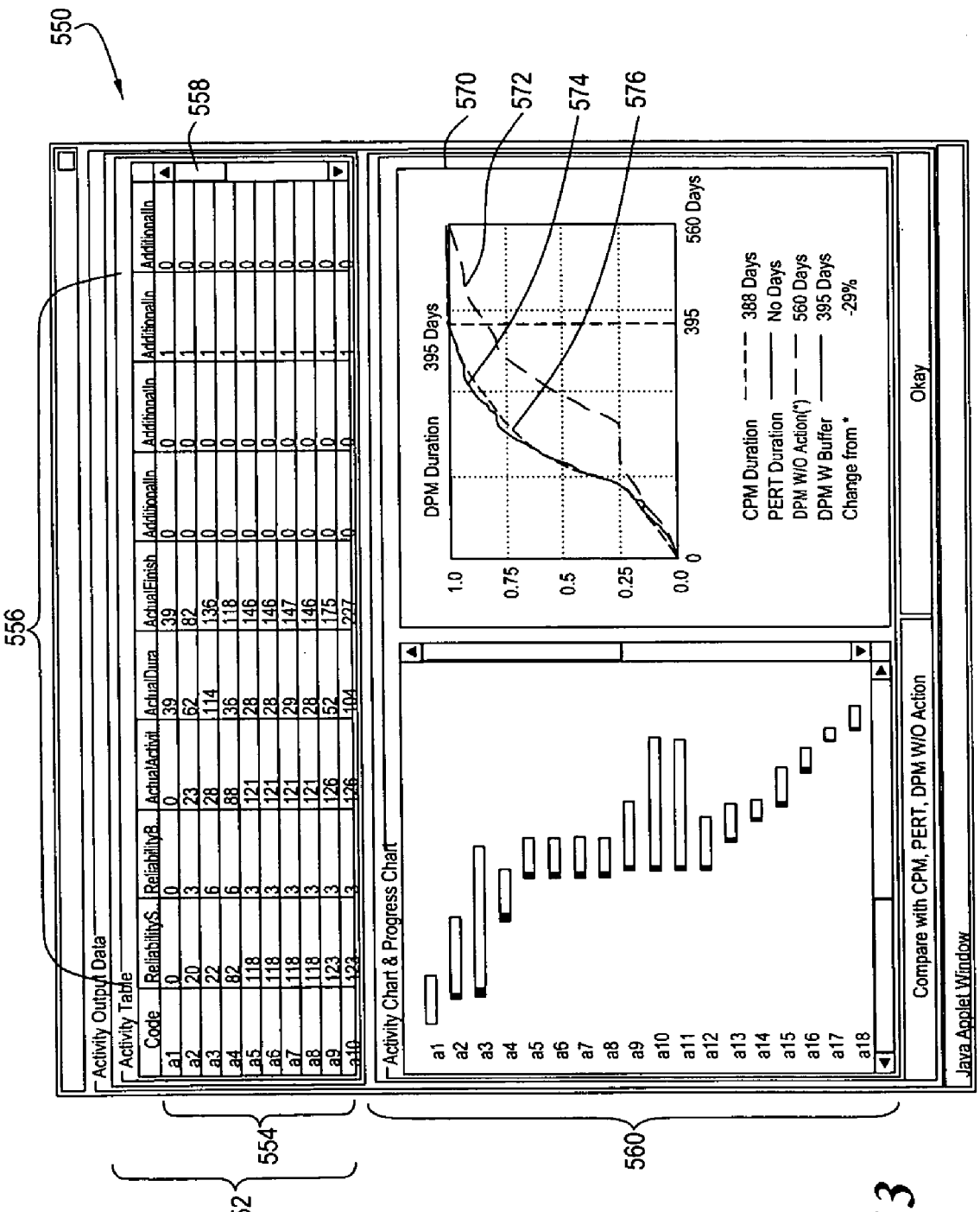
FIG. 13 is a GUI including a project S curve DPM simulation output.

Referring now to FIG. 13, an illustrative GUI 550 of a simulation output includes an activity table 552. The activity table 552 is a tabular listing of the project plan data element values associated with each activity. Here, a list of activities is shown in the first column 554. Project plan data elements are shown in the subsequent columns 556. The activity table shows only a portion of the activities 554, corresponding to a selected range 554 of activities of the overall DPM project plan, and the particular portion is selected by the user with a slide bar 558. The GUI 550 also includes a view of a particular portion of the DPM project plan 560 corresponding to that of the portion represented by the activity table 552. The DPM project plan view 560 is similar to that described in association with FIG. 12, yet some of the details can be omitted. For example, the names of the activities can be omitted.

The simulation chart 550 also includes a simulation output graph 570, for which the vertical axis is a percent completion of the project, where 1.0 corresponds to 100 percent, and the horizontal axis is a time scale corresponding to the selected portion 554 of the activity table 552. The simulation output graph 570 provides a percent complete of the total group of project activities versus time. The simulation chart 570 can compare the percent complete versus time of the DPM project plan without action 572, (i.e. without managerial actions and without reliability buffering (the DPM project plan)), with the DPM project plan including reliability buffers 574, with a conventional CPM project plan 576, with a conventional project plan, for example PERT (not shown). In this way, the DPM plan can be compared against conventional project planning models described above.

Figure 14:
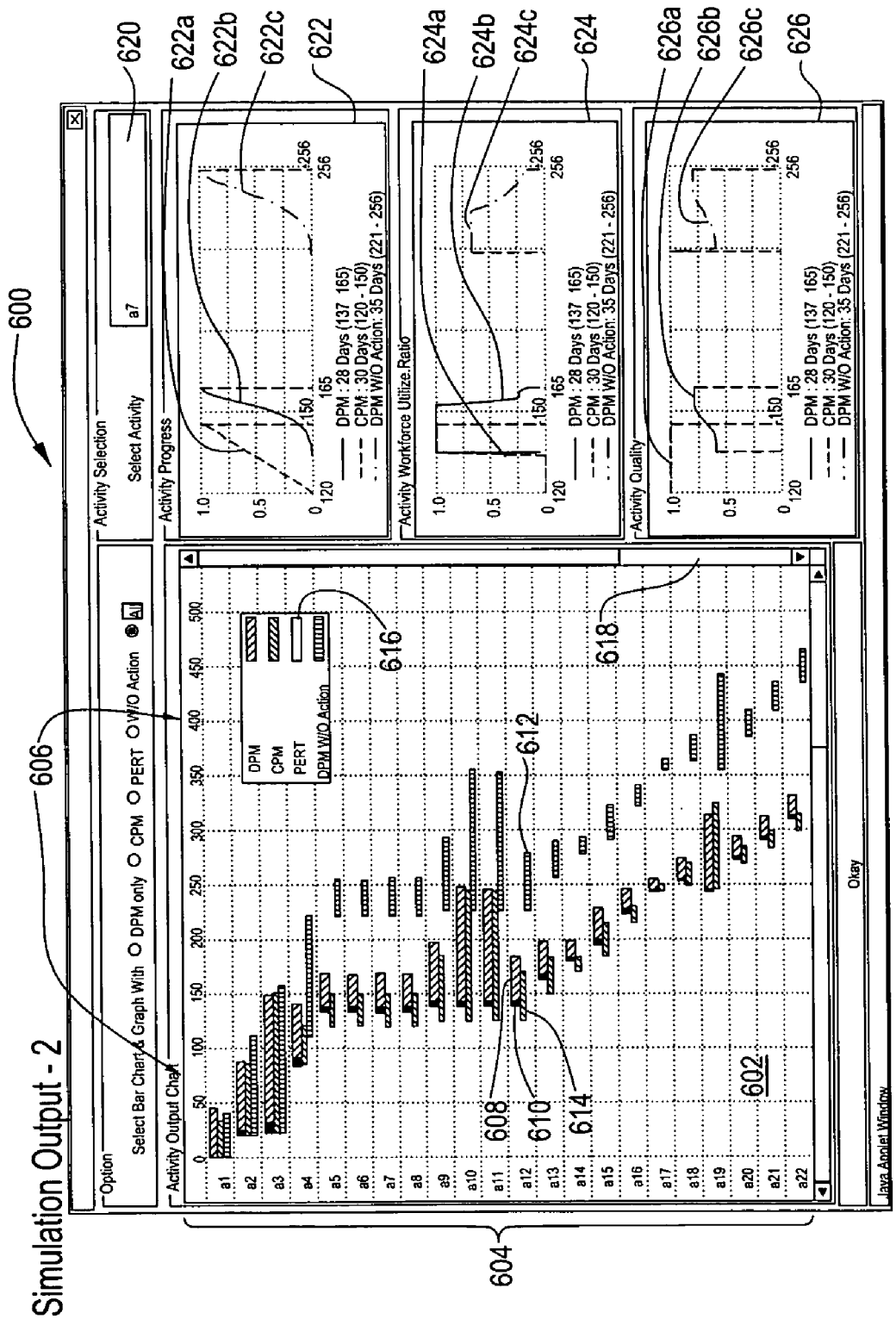
FIG. 14 is a GUI including an activity S curve DPM simulation output.

Referring now to FIG. 14, a chart of another illustrative GUI 600 of a simulation output includes an activity output chart 602. The activity output chart 602 is provided having a vertical scale 604 corresponding to an activity number, and a horizontal scale 606 corresponding to time in days. The activity output chart 602 further includes a view of a particular portion of the DPM project plan shown as time bars, for which the time bar 608 is but one of the DPM project plan time bars. A reliability buffer, for example reliability buffer 610, precedes some of the DPM plan bars. The activity output chart 602 further includes a particular portion of a DPM project plan without action shown as time bars, for which the time bar 612 is but one of the DPM without action time bars, (i.e. bars without corresponding managerial actions and without reliability buffering (the DPM project plan)). The activity output chart 602 further includes a particular portion of a conventional CPM project plan shown as time bars, for which the time bar 614 is but one of the CPM time bars. Note also that the activity output chart 602 can include time bars from other conventional project plans, for example PERT 616. The activity output chart 602 further includes a slide bar 618 with which the user can select the portion of the project plan to view on the illustrative GUI 600.

The illustrative GUI 600 also includes an activity selection box 620 with which the user can select a particular project activity from the variety of project activities. An activity progress simulation box 622, for which the vertical scale corresponds to percent complete and the horizontal scale corresponds to time in days, includes a progress graph 622a corresponding to the portion of the CPM project plan, a progress graph 622b corresponding to the portion of the DPM project plan, and a progress graph 622c corresponding to the portion of the DPM project plan without action. An activity workforce utilization simulation box 624, for which the vertical scale corresponds to percent and the horizontal scale corresponds to time in days, includes a workforce graph 624a corresponding to the portion of the CPM project plan, a workforce graph 624b corresponding to the portion of the DPM project plan, and a workforce graph 624c corresponding to the portion of the DPM project plan without action. An activity quality simulation box 626, for which the vertical scale corresponds to percent and the horizontal scale corresponds to time in days, includes an activity quality graph 626a corresponding to the portion of the CPM project plan, an activity quality graphs 626b corresponding to the portion of the DPM project plan, and an activity quality graph 626c corresponding to the portion of the DPM project plan without action. The project plan chart 602 and the three simulation charts 622, 624, 626 can provide the user with comparative information about the DPM project plan versus a plan made with conventional project planning model.

Figure 15:
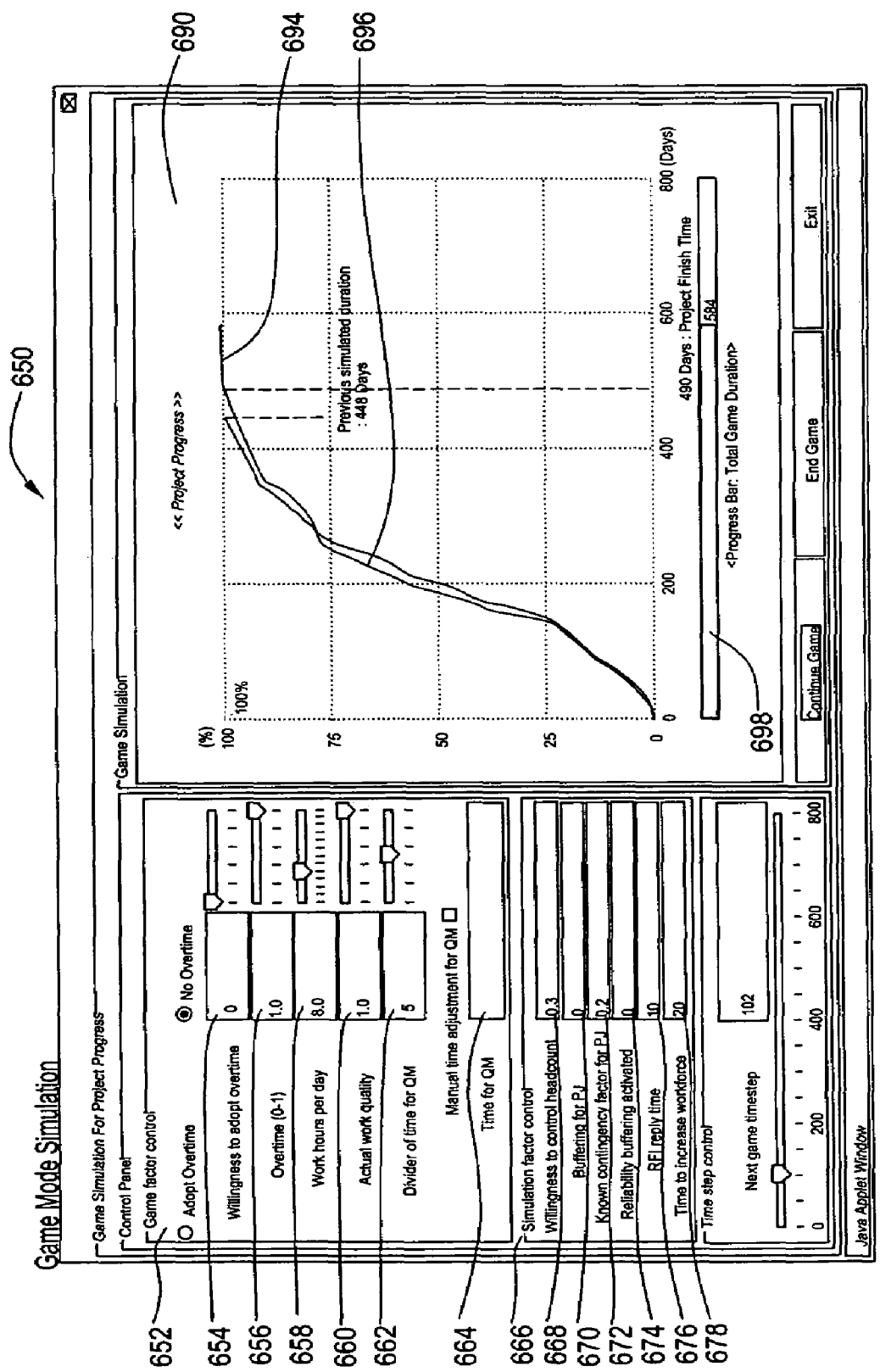
FIG. 15 is a GUI including a what-if scenario interface DPM simulation output.

Referring now to FIG. 15, an illustrative GUI 650 of yet another output includes a game factor control box. The user can enter a willingness to accept overtime value 654, a maximum overtime value 656, a work hours per day value 658, an actual work quality value 660, and a time for QM value 664. These values correspond to policy data values described above. The GUI 600 also includes a simulation factor control box 664 with which the user can enter a willingness to control headcount value 666, a buffering for project (PJ) value 668, (a time ratio applied to all reliability buffers), a known contingency factor for PJ value 670 (a contingency buffer value, believed to already be associated with all project activities, that is thereby removed from all project activities), a reliability buffer activation value 672, a request for information (RFI) reply time value 674, and a time to increase workforce value 676.

The GUI 650 also includes a game simulation output graph 690, for which the vertical scale represents percent complete and the horizontal scale represents time in days. A graph 694 corresponds to a total DPM project plan progress versus time corresponding to the various values entered in the game factor control box 652 and the simulation factor control box 666. A graph 696 corresponds to the total DPM project plan progress versus time for a prior set of values entered into the game factor control box 652 and the simulation factor control box 666. Thus, by comparing graph 694 with graph 696, a user can understand the total effect of a change in the factors entered in the game factor control box 652 and the simulation factor control box 666.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A computer-implemented method of dynamic project planning, comprising:
    generating a project list having a plurality of activities, each activity having a respective activity name;
    structuring selected activities from among the plurality of activities with respective activity pre-structured process models, the activity pre-structured process models having respective activity characteristics values;
    generating time precedence relationships between the plurality of activities;
    structuring the time precedence relationships with respective activity relationship pre-structured models, the activity relationship pre-structured models having respective activity relationship values;
    selecting a first activity having a first activity name from among the plurality of activities, wherein the first activity is associated with a first one of the activity pre-structured process models having a first activity characteristics value, wherein the first activity is associated with a first one of the activity relationship pre-structured models having a first activity relationship value;
    updating at least one of the first activity characteristics value or the first activity relationship value;
    automatically identifying, in response to the updating, a second activity having a second activity name from among the plurality of activities, wherein the first activity does not include the second activity and the second activity does not include the first activity, wherein the second activity is associated with a second activity pre-structured process model having a second activity characteristics value, wherein the second activity is associated with a second one of the activity relationship pre-structured models having a second activity relationship value, wherein the second activity characteristics value is the same as the first activity characteristics value or the second activity relationship value is the same as the first activity relationship value; and
    automatically updating, in response to the updating at least one of the first activity characteristics value or the first activity relationship value, a corresponding at least one of the second activity characteristics value or the second activity relationship value.

2. The method of claim 1, wherein the structuring selected activities comprises:
    providing at least one of the activity characteristics values as an activity reliability value, wherein the activity reliability value is indicative of at least one of a likelihood that an activity from among the plurality of activities achieves a planned duration and schedule, or a likelihood that an output work product of the activity will be of sufficient quality so as not to impact a schedule of downstream activities from among the plurality of activities; and
    associating the activity reliability value with at least one of the activities within the plurality of activities and with a corresponding at least one of the activity pre-structured process models.

3. The method of claim 1, wherein the structuring selected activities comprises:
    providing at least one of the activity characteristics values as a production type value, wherein the production type value is indicative of a speed of an activity from among the plurality of activities in relation to a normal production rate for the activity; and
    associating the production type value with at least one of the activities within the plurality of activities and with a corresponding at least one of the activity pre-structured process models.

4. The method of claim 1, wherein the structuring the time precedence relationships comprises:
    providing at least one of the activity relationship values as a time precedence relationship value; and
    associating the time precedence relationship value with at least one of the time precedence relationships and with a corresponding at least one of the activity relationship pre-structured models.

5. The method of claim 1, wherein the structuring the time precedence relationships comprises:
    providing at least one of the activity relationship values as a sensitivity value; and
    associating the sensitivity value with at least one of the time precedence relationships and with a corresponding at least one of the activity relationship pre-structured models.

6. The method of claim 1, further comprising:
    associating a policy value with at least one of the selected activities and with a respective at least one of the activity pre-structured process models, wherein the policy value is indicative of at least one if a manpower availability versus time value, an overtime and flexibility of worker headcount control value, a thoroughness of quality control value, a hiring time control value, or a request for information (RFI) time control value.

7. The method of claim 1, wherein at least one of the time precedence relationships and a corresponding at least one of the activity relationship pre-structured models includes a reliability buffer extending prior to a start time of a downstream one of the plurality of activities and coupled to an upstream one of the plurality of activities.

8. The method of claim 7, wherein the at least one of the time precedence relationships is indicative of a relationship between the end of the upstream activity and the start of the reliability buffer.

9. The method of claim 7, wherein the reliability buffer is associated with a corresponding one of the activity relationship values.

10. The method of claim 1, further comprising:
associating a policy value with at least one of the time precedence relationships and with a respective at least one of the activity relationship pre-structured models, wherein the policy value is indicative of a buffering policy.

11. The method of claim 1, wherein the auto automatically updating the second activity relationship value comprises:
automatically updating a reliability buffer extending prior to a start time of the second activity, wherein the updated reliability buffer has at least one of an updated duration value, an updated upstream time precedence relationship value between the updated reliability buffer and an upstream activity, or an updated downstream time precedence relationship between the updated reliability buffer and the second activity.

12. The method of claim 1, wherein the automatically updating the second activity relationship value comprises:
structuring the first activity relationship pre-structured model with a first reliability buffer having the first activity relationship value, wherein the first reliability buffer is associated with a start time of the first activity;
structuring the second activity relationship pre-structured model with a second reliability buffer having the second activity relationship value, wherein the second reliability buffer is associated with a start time of the second activity; and
automatically updating the second activity relationship value in response to the updating the first activity relationship value.

13. The method of claim 1, wherein the second activity has a similar activity name as the first activity.

14. The method of claim 1, wherein the updating comprises updating the first activity relationship value, wherein the automatically updating comprises automatically updating the second activity relationship value in response to the updating the first activity relationship value.

15. The method of claim 14, wherein the automatically updating comprises automatically updating a time buffer associated with the second activity in response to the updating the first activity relationship value.

16. A dynamic planning apparatus comprising:
a dynamic planning method (DPM) data processor that provides a plurality of activities having respective activity data that includes at least one of policy data, activity characteristics data, or activity relationship data; and
a DPM processor coupled to the DPM data processor to process the activity data, wherein the DPM processor is adapted to automatically update second activity data from among the activity data in response to an update of first activity data from among the activity data, wherein the first and second activity data are associate with first and second activities, respectively, wherein the first activity does not include the second activity and the second activity does not include the first activity.

17. The dynamic planning apparatus of claim 16, wherein the DPM processor also provides one or more DPM performance profiles.

18. The dynamic planning apparatus of claim 16, wherein the DPM data processor includes:
a DPM policy data processor that provides the policy data, wherein the policy data is indicative of at least one of a manpower availability versus time value, an overtime and flexibility of worker headcount control value, a thoroughness of quality control value, a hiring time control value, a request for information (RFI) time control value, or a buffering policy; and
a DPM activity data processor that provides the activity characteristics data and the activity relationship data.

19. The dynamic planning apparatus of claim 18, wherein the DPM activity data processor includes a dependency structure matrix GUI for entry of at least one of the activity characteristics data or the activity relationship data, wherein the dependency structure matrix includes a vertical axis that lists the plurality of activities and a horizontal axis that lists the plurality of activities.

20. The dynamic planning apparatus of claim 16, further comprising:
one or more conventional project planning models that provide conventional project plan data; and
a data transfer processor coupled to the one or more conventional project planning models and further coupled to the DPM data processor to receive the conventional project plan data from the one or more conventional project planning models and to provide formatted data to the DPM data processor.

21. The dynamic planning apparatus of claim 16, wherein the DPM processor is adapted to automatically update a second activity relationship value from among the activity data in response to an update of a first activity relationship value from among the activity data.

22. The dynamic planning apparatus of claim 21, wherein the DPM processor is adapted to automatically update a time buffer associated with the second activity in response to the update of the first activity relationship value from among the activity data.

23. The dynamic planning apparatus of claim 18, wherein the DPM activity data processor includes:
a DPM activity characteristics graphical user interface (GUI) that provides the activity characteristics data; and
a DPM activity relationship GUI that provides the activity relationship data.

* * * * *

UNITED STATES PATENT AND TRADEMARK OFFICE
CERTIFICATE OF CORRECTION

PATENT NO. : 7,349,863 B1  
APPLICATION NO. : 10/068119  
DATED : March 25, 2008  
INVENTOR(S) : Pena-Mora et al.

Page 1 of 1

It is certified that error appears in the above-identified patent and that said Letters Patent is hereby corrected as shown below:

Col. 1, line 36, delete "pre-structure" and replace with --pre-structured--.

Col. 2, line 17, delete "which a two" and replace with --which two--.

Col. 2, line 30, delete "a" and replace with --an--.

Col. 2, line 61, delete "element." and replace with --elements.--.

Col. 4, line 1, delete "anther" and replace with --another--.

Col. 4, line 33, delete "is chart" and replace with --is a chart--.

Col. 4, line 36, delete "is chart" and replace with --is a chart--.

Col. 5, line 4, delete "time the" and replace with --time than the--.

Col. 5, line 17, delete "which a two" and replace with --which two--.

Col. 5, line 39, delete "corresponds" and replace with --correspond--.

Col. 5, line 42, delete "corresponds" and replace with --correspond--.

Col. 5, line 46, delete "corresponds" and replace with --correspond--.

Col. 6, line 49, delete "comprising" and replace with --comprise--.

Col. 8, line 49, delete "relationships" and replace with --relationship--.

Col. 9, line 19, delete "as" and replace with --as a--.

Col. 10, line 5, delete "list" and replace with --lists--.

Col. 10, line 5, delete "though" and replace with --through--.

Signed and Sealed this

Eleventh Day of August, 2009

David J. Kappos  
*Director of the United States Patent and Trademark Office*